United States Patent
Hanna

(10) Patent No.: US 10,055,733 B2
(45) Date of Patent: Aug. 21, 2018

(54) BIOMETRIC CHAIN OF PROVENANCE

(71) Applicant: EyeLock LLC, New York, NY (US)

(72) Inventor: Keith J. Hanna, New York, NY (US)

(73) Assignee: EYELOCK LLC, New York, NY (US)

( * ) Notice: Subject to any disclaimer, the term of this patent is extended or adjusted under 35 U.S.C. 154(b) by 344 days.

(21) Appl. No.: 14/919,323

(22) Filed: Oct. 21, 2015

(65) Prior Publication Data
US 2016/0104165 A1    Apr. 14, 2016

Related U.S. Application Data

(63) Continuation of application No. 13/450,151, filed on Apr. 18, 2012.
(Continued)

(51) Int. Cl.
*G06Q 20/40* (2012.01)
*G06F 21/32* (2013.01)
(Continued)

(52) U.S. Cl.
CPC ....... *G06Q 20/40145* (2013.01); *G06F 21/32* (2013.01); *G06Q 20/3224* (2013.01);
(Continued)

(58) Field of Classification Search
CPC .... G06F 7/04; G06F 21/32; G06F 2221/2111; G06Q 20/40145; G06Q 20/4016;
(Continued)

(56) References Cited

U.S. PATENT DOCUMENTS

| 4,641,349 A | 2/1987 | Flom et al. |
| 5,259,040 A | 11/1993 | Hanna |

(Continued)

FOREIGN PATENT DOCUMENTS

| KR | 20050065132 | 6/2005 |
| KR | 100564766 | 3/2006 |

(Continued)

OTHER PUBLICATIONS

B. Galvin, et al., Recovering Motion Fields: An Evaluation of Eight Optical Flow Algorithms, Proc. of the British Machine Vision Conf. (1998).
(Continued)

*Primary Examiner* — Edwin Holloway, III
(74) *Attorney, Agent, or Firm* — Foley & Lardner LLP

(57) ABSTRACT

The present disclosure is directed towards methods and systems for ensuring integrity of biometric data for one or more transactions. A mobile biometric device may acquire biometric information of an individual. A ranging module of a transaction device may determine that a distance between the mobile biometric device and a physical location of a first transaction with the individual is within a predefined value. The transaction device may link, responsive to the determination, the acquired biometric information to the first transaction if the biometric information is acquired within a specific time limit from the distance determination. The transaction device may link the acquired biometric information to a universal biometric record of the individual. A biometric integrity engine may compare information from the first transaction and a second transaction for inconsistency or fraud.

20 Claims, 42 Drawing Sheets

Related U.S. Application Data

(60) Provisional application No. 61/476,826, filed on Apr. 19, 2011, provisional application No. 61/541,118, filed on Sep. 30, 2011.

(51) Int. Cl.
  *G06Q 20/32* (2012.01)
  *H04L 29/06* (2006.01)
  *H04W 12/06* (2009.01)

(52) U.S. Cl.
  CPC ..... *G06Q 20/4016* (2013.01); *H04L 63/0861* (2013.01); *H04W 12/06* (2013.01); *G06F 2221/2111* (2013.01); *H04L 63/107* (2013.01); *H04L 63/108* (2013.01)

(58) Field of Classification Search
  CPC ............ G06Q 20/3224; H04L 63/0861; H04L 63/107; H04L 63/108; H04W 12/06
  USPC ................................................ 340/5.52, 5.82
  See application file for complete search history.

(56) References Cited

U.S. PATENT DOCUMENTS

| | | |
|---|---|---|
| 5,291,560 A | 3/1994 | Daugman |
| 5,488,675 A | 1/1996 | Hanna |
| 5,572,596 A | 11/1996 | Wildes et al. |
| 5,581,629 A | 12/1996 | Hanna et al. |
| 5,613,012 A | 3/1997 | Hoffman et al. |
| 5,615,277 A | 3/1997 | Hoffman |
| 5,737,439 A | 4/1998 | Lapsley et al. |
| 5,764,789 A | 6/1998 | Pare et al. |
| 5,802,199 A | 9/1998 | Pare et al. |
| 5,805,719 A | 9/1998 | Pare et al. |
| 5,838,812 A | 11/1998 | Pare et al. |
| 5,901,238 A | 5/1999 | Matsushita |
| 5,953,440 A | 9/1999 | Zhang et al. |
| 5,978,494 A | 11/1999 | Zhang |
| 6,021,210 A | 2/2000 | Camus et al. |
| 6,028,949 A | 2/2000 | McKendall |
| 6,064,752 A | 5/2000 | Rozmus et al. |
| 6,069,967 A | 5/2000 | Rozmus et al. |
| 6,144,754 A | 11/2000 | Okano et al. |
| 6,192,142 B1 | 2/2001 | Pare et al. |
| 6,247,813 B1 | 6/2001 | Kim et al. |
| 6,252,977 B1 | 6/2001 | Salganicoff et al. |
| 6,289,113 B1 | 9/2001 | McHugh et al. |
| 6,366,682 B1 | 4/2002 | Hoffman et al. |
| 6,373,968 B2 | 4/2002 | Okano et al. |
| 6,377,699 B1 | 4/2002 | Musgrave et al. |
| 6,424,727 B1 | 7/2002 | Musgrave et al. |
| 6,483,930 B1 | 11/2002 | Musgrave et al. |
| 6,532,298 B1 | 3/2003 | Cambier et al. |
| 6,542,624 B1 | 4/2003 | Oda |
| 6,546,121 B1 | 4/2003 | Oda |
| 6,594,376 B2 | 7/2003 | Hoffman et al. |
| 6,594,377 B1 | 7/2003 | Kim et al. |
| 6,652,099 B2 | 11/2003 | Chae et al. |
| 6,700,998 B1 | 3/2004 | Murata |
| 6,714,665 B1 | 3/2004 | Hanna et al. |
| 6,760,467 B1 | 7/2004 | Min et al. |
| 6,850,631 B1 | 2/2005 | Oda et al. |
| 6,917,695 B2 | 7/2005 | Teng et al. |
| 6,980,670 B1 | 12/2005 | Hoffman et al. |
| 6,985,608 B2 | 1/2006 | Hoffman et al. |
| 7,095,901 B2 | 8/2006 | Lee et al. |
| 7,146,027 B2 | 12/2006 | Kim et al. |
| 7,248,719 B2 | 7/2007 | Hoffman et al. |
| 7,271,939 B2 | 9/2007 | Kono |
| 7,334,735 B1* | 2/2008 | Antebi .................. G01S 5/22 235/492 |
| 7,385,626 B2 | 6/2008 | Aggarwal et al. |
| 7,414,737 B2 | 8/2008 | Cottard et al. |
| 7,418,115 B2 | 8/2008 | Northcott et al. |
| 7,428,320 B2 | 9/2008 | Northcott et al. |
| 7,542,590 B1 | 6/2009 | Robinson et al. |
| 7,558,406 B1 | 7/2009 | Robinson et al. |
| 7,558,407 B2 | 7/2009 | Hoffman et al. |
| 7,574,021 B2 | 8/2009 | Matey |
| 7,583,822 B2 | 9/2009 | Guillemot et al. |
| 7,606,401 B2 | 10/2009 | Hoffman et al. |
| 7,616,788 B2 | 11/2009 | Hsieh et al. |
| 7,639,840 B2 | 12/2009 | Hanna et al. |
| 7,693,307 B2 | 4/2010 | Rieul et al. |
| 7,697,786 B2 | 4/2010 | Camus et al. |
| 7,715,595 B2 | 5/2010 | Kim et al. |
| 7,719,566 B2 | 5/2010 | Guichard |
| 7,797,606 B2 | 9/2010 | Chabanne |
| 7,869,627 B2 | 1/2011 | Northcott et al. |
| 7,929,732 B2 | 4/2011 | Bringer et al. |
| 7,978,883 B2 | 7/2011 | Rouh et al. |
| 8,009,876 B2 | 8/2011 | Kim et al. |
| 8,025,399 B2 | 9/2011 | Northcott et al. |
| 8,092,021 B1 | 1/2012 | Northcott et al. |
| 8,132,912 B1 | 3/2012 | Northcott et al. |
| 8,170,295 B2 | 5/2012 | Fujii et al. |
| 8,233,680 B2 | 7/2012 | Bringer et al. |
| 8,243,133 B1 | 8/2012 | Northcott et al. |
| 8,279,042 B2 | 10/2012 | Beenau et al. |
| 8,317,325 B2 | 11/2012 | Raguin et al. |
| 2002/0140542 A1 | 10/2002 | Prokoski et al. |
| 2003/0065918 A1* | 4/2003 | Willey ................ H04L 63/0492 713/168 |
| 2003/0112942 A1 | 6/2003 | Brown et al. |
| 2005/0084137 A1 | 4/2005 | Kim et al. |
| 2005/0269401 A1 | 12/2005 | Spitzer et al. |
| 2006/0074986 A1 | 4/2006 | Mallalieu et al. |
| 2006/0194592 A1 | 8/2006 | Clough |
| 2006/0237531 A1 | 10/2006 | Heffez et al. |
| 2007/0211922 A1 | 9/2007 | Crowley et al. |
| 2007/0260883 A1* | 11/2007 | Giobbi ................ G06Q 20/341 713/168 |
| 2008/0155268 A1 | 6/2008 | Jazayeri et al. |
| 2008/0223926 A1* | 9/2008 | Miller ................ G07C 9/00158 235/382 |
| 2009/0074256 A1 | 3/2009 | Haddad |
| 2009/0097715 A1 | 4/2009 | Cottard et al. |
| 2009/0161925 A1 | 6/2009 | Cottard et al. |
| 2009/0231096 A1 | 9/2009 | Bringer et al. |
| 2010/0021016 A1 | 1/2010 | Cottard et al. |
| 2010/0051684 A1 | 3/2010 | Powers |
| 2010/0074477 A1 | 3/2010 | Fujii et al. |
| 2010/0127826 A1 | 5/2010 | Saliba et al. |
| 2010/0246903 A1 | 9/2010 | Cottard |
| 2010/0278394 A1 | 11/2010 | Raguin et al. |
| 2010/0310070 A1 | 12/2010 | Bringer et al. |
| 2011/0158486 A1 | 6/2011 | Bringer et al. |
| 2011/0194738 A1 | 8/2011 | Choi et al. |
| 2011/0277518 A1 | 11/2011 | Lais et al. |
| 2012/0240223 A1 | 9/2012 | Tu |
| 2012/0257797 A1 | 10/2012 | Leyvand et al. |

FOREIGN PATENT DOCUMENTS

| | | |
|---|---|---|
| WO | WO-2010/062371 | 6/2010 |
| WO | WO-2011/093538 | 8/2011 |

OTHER PUBLICATIONS

J. R. Bergen, et al., Hierarchical Model-Based Motion Estimation, European Conf. on Computer Vision (1993).
K. Nishino, et al., The World in an Eye, IEEE Conf. on Pattern Recognition, vol. 1, at pp. 444-451 (Jun. 2004).
Office Action on U.S. Appl. No. 13/450,151 dated Apr. 22, 2015.
Office Action on U.S. Appl. No. 13/450,151 dated Sep. 2, 2014.
R. Kumar, et al., Direct recovery of shape from multiple views: a parallax based approach, 12th IAPR Int'l Conf. on Pattern Recognition.
R. P. Wildes, Iris Recognition: An Emerging Biometric Technology, Proc. IEEE 85(9) at pp. 134-863 (Sep. 1997).

(56) References Cited

OTHER PUBLICATIONS

Supplementary European Search Report on 12774130.4 dated Mar. 11, 2015.
Chinese First Office Action on 201280030217.6 dated May 5, 2016.

* cited by examiner

| PROVENANCE LINK | DESCRIPTION OF LINK | LINK PASSES RULES? |
|---|---|---|
| 1A | PERSON_A -> DEVICE_A | ✓ |
| 2A | DEVICE_A -> POS_A | ✓ |
| 3A | POS_A -> UBR_A(Biometric1) | ✓ |
| 4A AND/OR 4A' | 4A (UBR_A(Biometric1) -> UBR_A(Biometric1)) AND/OR 4A' (UBR_A(Biometric1) -> UUID_A) | ✓ |
| 5 AND/OR 5' | 5 (UBR_A(Biometric1) -> UBR_B(Biometric1)) AND/OR 5' (UUID_A -> UUID_B) | ✓ |
| 4B AND/OR 4B' | 4B (UBR_B(Biometric1) -> UBR_B(Biometric2)) AND/OR 4B' (UUID_B -> UBR_B(Biometric2)) | ✓ |
| 3B | UBR_B(Biometric2) -> POS_B | ✓ |
| 2B | POS_B -> DEVICE_B | ✓ |
| 1B | DEVICE_B -> PERSON_B | ✓ |
| PROVENANCE CONFIRMED OR DENIED -> | PERSON_A -> PERSON_B | ✓ |

FIG. 2C

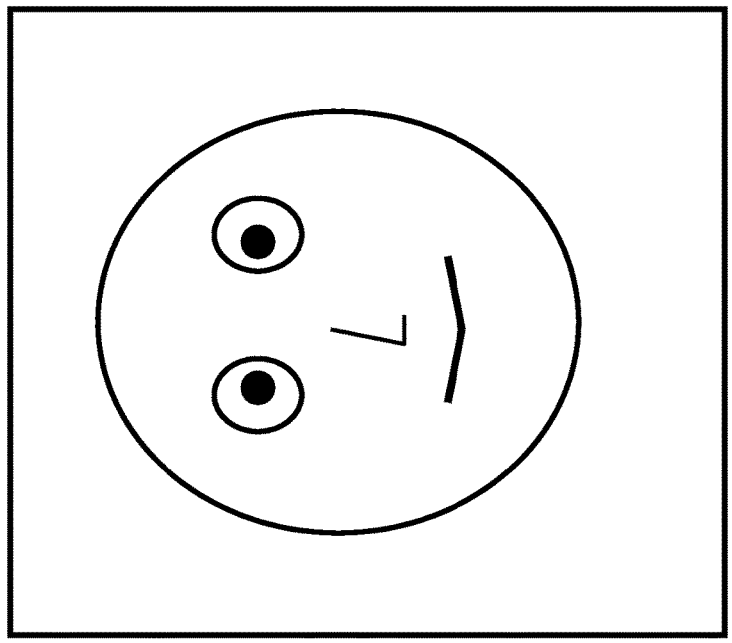
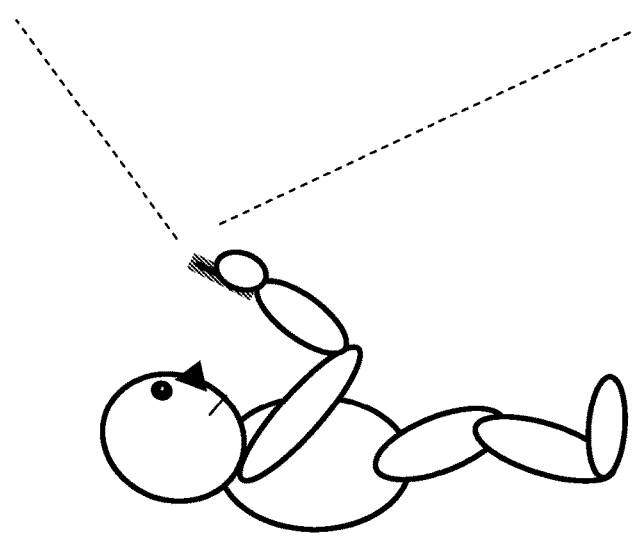
FIG. 11

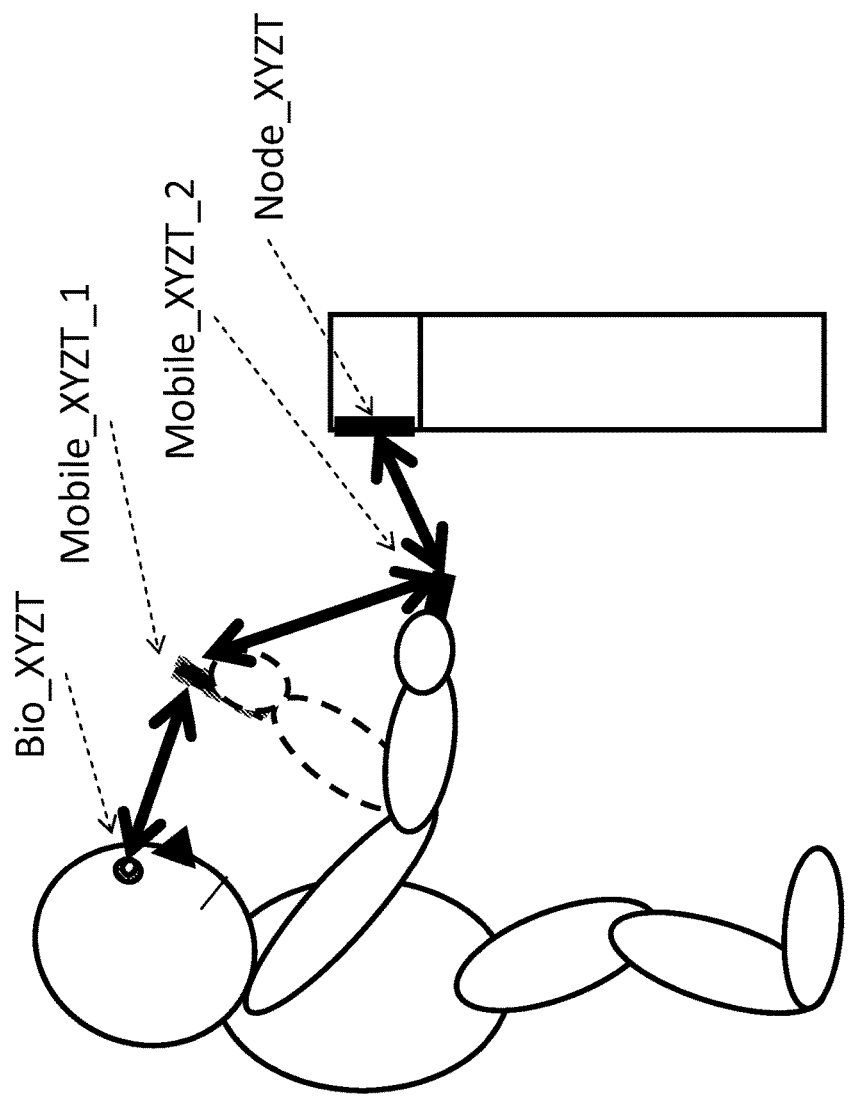
FIG. 28 Chain of Biometric Provenance

| Element in Chain | Spatial Position | Time |
|---|---|---|
| Bio | XYZ_a | T_a |
| Mobile_b | XYZ_b | T_b |
| Mobile_c | XYZ_c | T_c |
| Node | XYZ_d | T_d |

Chain of Biometric Provenance Confirmed

| Difference in Elements in Chain | Difference in Spatial Position | Time Difference | Chain of Provenance Rule | Rule Result |
|---|---|---|---|---|
| Mobile_b - Bio | XYZ_b – XYZ_a | T_b–T_a | Is \|\| (XYZ_b–XYZ_a) \|\| < D1 ? | YES |
| Mobile_c – Mobile_b | XYZ_c – XYZ_b | T_c–T_b | Is (T_c – T_b) < T2 ? | YES |
| Node – Mobile_c | XYZ_d – XYZ_c | T_d–T_c | Is \|\| (XYZ_d–XYZ_c) \|\| < D3 ? | YES |

FIG. 29   Chain of Biometric Providence Confirmed

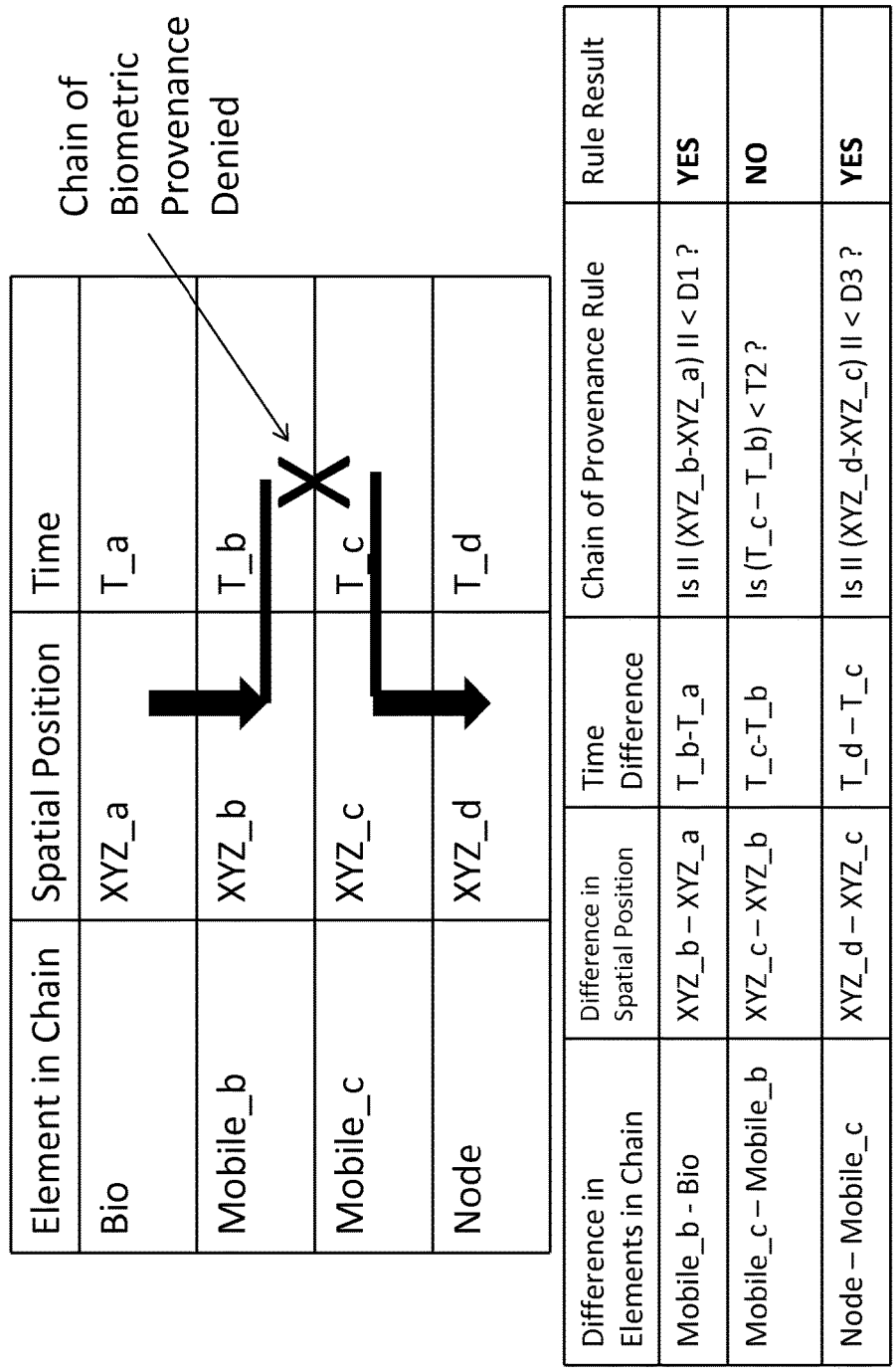
FIG. 30  Chain of Biometric Providence Denied

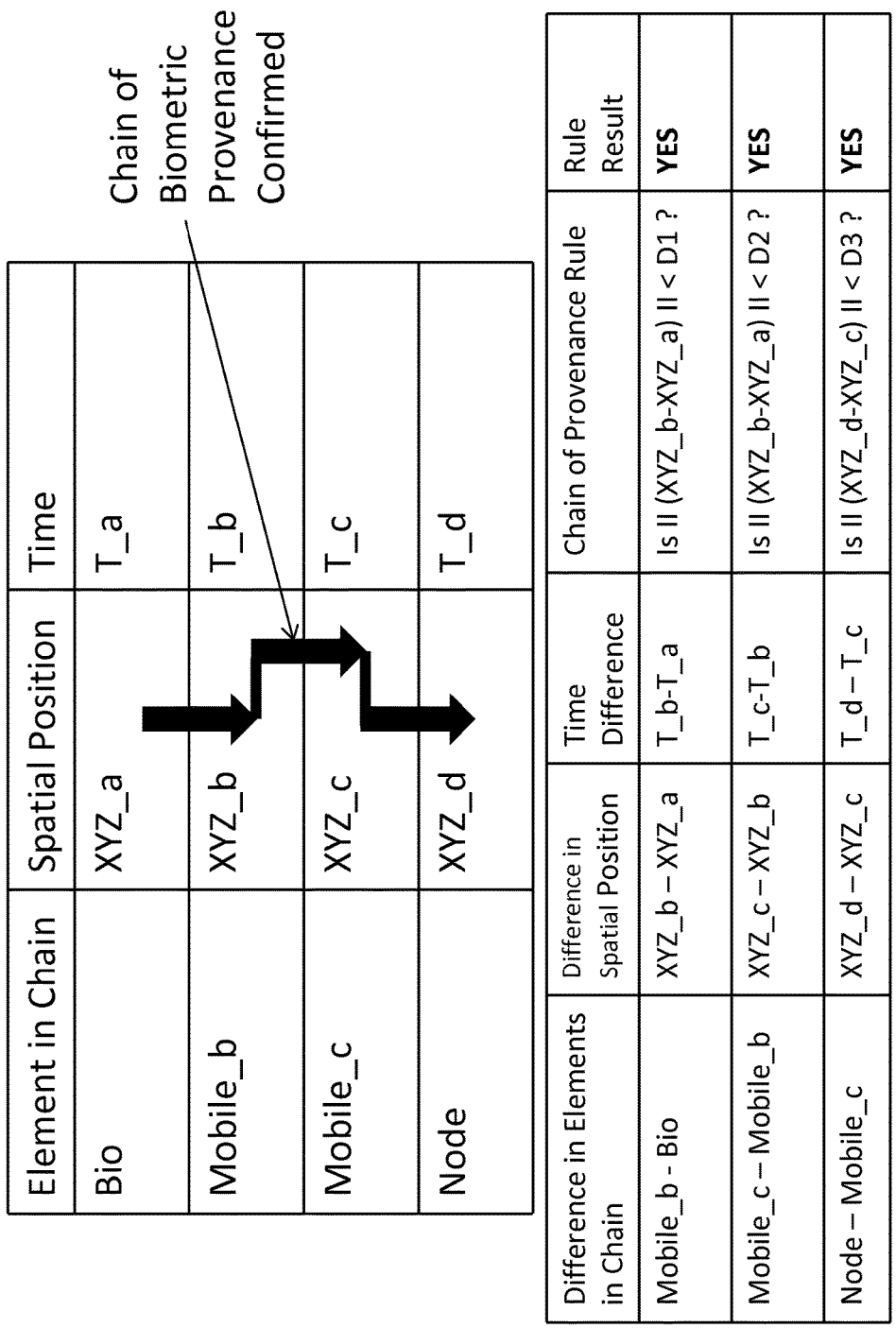
FIG. 31    Chain of Biometric Providence Confirmed

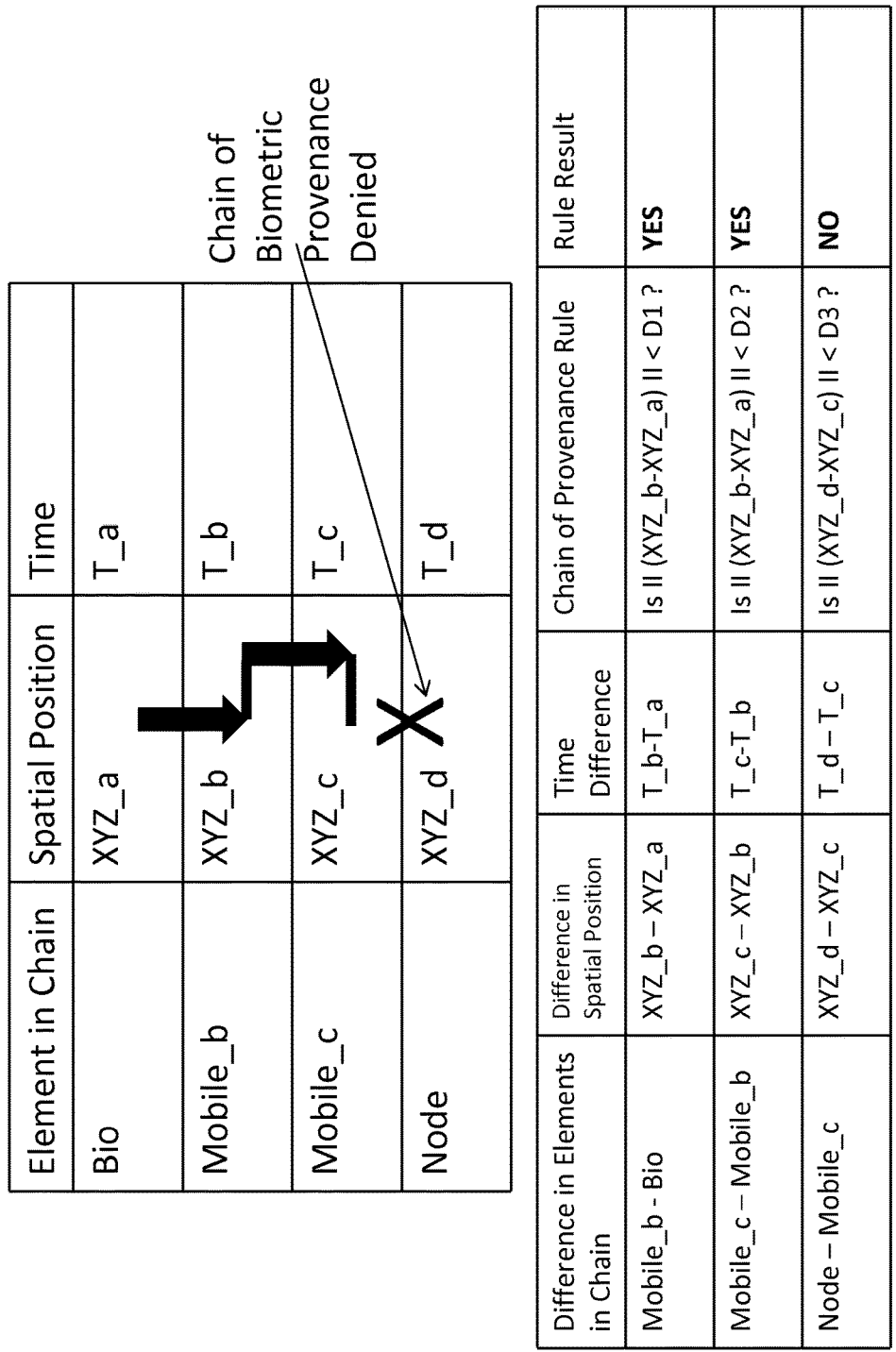
FIG. 32  Chain of Biometric Providence Denied

| Element in Chain | Spatial Position | Time |
|---|---|---|
| Bio | XYZ_a | T_a |
| Mobile_b | XYZ_b | T_b |
| Mobile_c | XYZ_c | T_c |
| Node | XYZ_d | T_d |

Chain of Biometric Provenance Denied

| Difference in Elements in Chain | Difference in Spatial Position | Time Difference | Chain of Provenance Rule | Rule Result |
|---|---|---|---|---|
| Mobile_b – Bio | XYZ_b – XYZ_a | T_b-T_a | Is ‖ (XYZ_b-XYZ_a) ‖ < D1 ? | YES |
| Mobile_c – Mobile_b | XYZ_c – XYZ_b | T_c-T_b | Is (‖ (XYZ_b-XYZ_a) ‖ < D2) && ( (T_c – T_b) < T2 ) ? | NO |
| Node – Mobile_c | XYZ_d – XYZ_c | T_d – T_c | Is ‖ (XYZ_d-XYZ_c) ‖ < D3 ? | YES |

Chain of Biometric Providence Denied

FIG. 33

BIOMETRIC CHAIN OF PROVENANCE

RELATED APPLICATION

The present application claims the benefit of and priority to U.S. Provisional Patent Application No. 61/476,826, entitled "Mobile Biometric Authentication System", filed Apr. 19, 2011, and claims the benefit of and priority to Provisional Patent Application No. 61/541,118, entitled "Remote Authorization System", filed Sep. 30, 2011, both of which are incorporated herein by reference in their entireties for all purposes.

FIELD OF THE DISCLOSURE

The present disclosure relates to identity verification technologies, and more specifically to systems and methods directed to providing or ensuring a biometric chain of provenance.

BACKGROUND

The potential for fraud in financial transactions has increased significantly due to the increasing diversity in the means for transactions to be performed. For example, it is often challenging to ensure that biometrics acquired by a biometrics device are really those of an individual at the biometrics device. Moreover, in certain contexts, it may be necessary or more acceptable to acquire biometric of a moving individual without constraining the individual's advance or movements. However, conventional systems are typically not very robust against fraud and/or mistake when biometric acquisition is decoupled from traditional access control systems, or when individuals whose biometrics are being acquired are not rigidly constrained for the biometric acquisition process. Some ability to track an individual across one or more transactions may be a way to reduce fraudulent activity.

SUMMARY

The present disclosure describes methods and systems for tracking the provenance of an individual between disparate transactions that they perform, be they logical and/or physical access transactions. The present methods and systems may use acquisition and optional matching of potentially disparate biometrics at each point of transaction, and may provide means to ensure the provenance of each step within each transaction and/or between each transaction.

In some aspects, we leverage on one or more of the following to ensure integrity of acquired biometrics linked to one or more transactions: 1) the ability to track a particular individual to a transaction, and 2) the ability to track one transaction to a second transaction. In this way, the activity of a single individual can be tracked from one transaction to the next. This Biometric Chain of Provenance (BCP) can then be audited and verified, for example, not just between two transactions, but between many transactions that the individual performs. Every transaction, be it buying a coffee or buying a house or setting up a bank account, is therefore an opportunity for the integrity of the biometric chain of provenance to be validated. Any inconsistencies in the BCP computed either in real-time while a transaction is performed, or after-the-fact indicates that fraudulent activity is occurring (or potentially occurring) or has occurred (or potentially occurred). Due to the BCP, there is a substantial audit-trail and therefore we may: a) detect fraud based on the detection of anomalies in the audit-trail, b) identify the fraudster based on information contained in the audit-trail, and c) deter fraudulent activity since fraudsters know that such a biometric-based audit trail is known to exist.

As mentioned above, the ability to track a particular individual to a transaction can be a critical element in the process. Biometrics is the field of measurement of human characteristics, and the acquisition and optional matching of biometric data can be a component in such a process. However, it may be important that the provenance of the biometric information itself is ensured step by step between the individual, a device (static or mobile) that collects the biometric data, any point of sale (POS) terminal that communicates to said device, and the rest of the transactional system, for example in everyday environments, such as a busy check-out line with multiple people, or in a mobile unattended environment. The present disclosure describes embodiments of such methods in detail.

It is also recognized that the device platforms on which transactions are performed are becoming more disparate, as are the locations where they are performed. Devices and applications may therefore contain only certain biometrics such as iris, face or voice due to cost or availability constraints. The iris biometric in particular can be a powerful biometric for tracking transactions due to its standardization and its accuracy. If there is a need to search through millions of records to associate transactions just based on a biometric, then the iris biometric may be best-placed to do so compared to face and voice and many other biometrics. This can be most significant at the beginning of the BCP when a customer presents themselves to open up a new account, for example. A verification step in the BCP may check whether the customer should be linked to prior BCP activity (e.g., is the customer attempting to assume multiple identities). This can be performed reliably and quickly with the iris biometric. However, as discussed earlier, the platforms on which transactions are performed are becoming more disparate and non-iris biometrics may be used. The present disclosure describes in detail embodiments of methods for maintaining the Biometric Chain of Provenance even when disparate biometrics are used.

In one aspect, the present disclosure is directed to a method for ensuring integrity of biometric data linked to one or more transactions. A mobile biometric device may acquire biometric information of an individual. A ranging device may determine that a distance between the mobile biometric device and a physical location of a transaction with the individual is within a predefined value. The ranging device or a transaction device may link, responsive to the determination, the acquired biometric information to the transaction if the biometric information is acquired within a specific time limit from the distance determination.

In some embodiments, the ranging device or transaction device may compute the specific time limit based on an amount or rate of change in the location of the mobile biometric device. The ranging device may determine the distance between the mobile biometric device and the physical location via a global positioning system. The ranging device may determine the distance between the mobile biometric device and the physical location using a short-range location system, using one or more of a: radio-frequency, laser, infra-red and audio ranging process. In some embodiments, the biometric device may transmit the acquired biometric information to a biometric matching device located at or connected to the physical location. The biometric device may transmit the acquired biometric information to a transaction device located at or connected to the physical location if the distance is determined to be within the predefined value.

In some embodiments, the ranging device or transaction device may link the acquired biometric information to the transaction if the acquired biometric information is received by a transaction device associated with the physical location within a predetermined time period of initiating the transaction. The ranging device or transaction device may link the acquired biometric information to the transaction if the distance between the physical location and the biometric device at the time the transaction is initiated is within a specified value. The transaction device at the physical location may allow or deny the transaction at the physical location based on biometric verification using the acquired biometric information. The transaction device may allow or deny the transaction based on biometric verification using the acquired biometric information, the transaction comprising one of: a point-of-sale transaction, a point-of-service transaction, and an access control transaction.

In some embodiments, the ranging device determines the distance between the mobile biometric device and a physical location based on strength of a signal received at one of: the physical location and the mobile biometric device, and transmitted by the other. The biometric device and/or the transaction device may identify the individual based on the acquired biometrics, and linking the transaction at the physical location with the individual. The biometric device and/or the transaction device may retrieve an identifier of the individual based on the acquired biometrics, and linking the transaction at the physical location with the identifier. The transaction device may link the transaction with another transaction linked to the individual, and comparing information of both transactions for inconsistency or fraud. The transaction device may link the transaction to a universal biometric record of the individual. The universal biometric record may include biometric information of a first type that matches the acquired biometric information.

In another aspect, the disclosure is directed to a method for ensuring integrity of biometric data linked to one or more transactions. A biometric device may acquire biometric information of an individual. A transaction device may link the acquired biometric information to a first transaction of the individual and a universal biometric record of the individual. The universal biometric record may include biometric information of a first type that matches the acquired biometric information, and may include biometric information of a second type. The transaction device or a biometric integrity engine may identify, via the universal biometric record, a second transaction. The second transaction may be linked to acquired biometric information that matches the biometric information of the second type. The transaction device or biometric integrity engine may compare information from the first transaction and the second transaction for inconsistency or fraud.

In yet another aspect, the disclosure is directed to a method for ensuring integrity of biometric data linked to one or more transactions. A biometric device may acquire biometric information of an individual. A transaction device may link the acquired biometric information to a first transaction of the individual. The universal biometric record may include an identifier of the individual and/or biometric information of a first type that matches the acquired biometric information. The transaction device or a biometric integrity engine may identify a second transaction linked with the identifier of the individual. The transaction device or biometric integrity engine may compare information from the first transaction and the second transaction for inconsistency or fraud.

In still another aspect, the disclosure is directed to a system for ensuring integrity of biometric data linked to one or more transactions. The system may include a mobile biometric device acquiring biometric information of an individual. A ranging device may determine that a distance between the mobile biometric device and a physical location of a transaction with the individual is within a predefined value. The ranging device or a transaction device of the physical location may link, responsive to the determination, the acquired biometric information to the transaction if the biometric information is acquired within a specific time limit from the distance determination.

In some embodiments, the system includes a database comprising a universal biometric record of the individual, for linking to the transaction. The universal biometric record may include biometric information of a first type that matches the acquired biometric information, and biometric information of a second type. The ranging device may compute the specific time limit based on an amount or rate of change in the location of the mobile biometric device. In certain embodiments, the system includes a mirror module at the physical location. The mirror module may be oriented to allow the acquisition of the biometric data using a rear-facing camera on the biometric device. In some embodiments, the system includes a second biometric device for acquiring imagery of the individual at substantially the same time as the acquisition of the biometric data.

BRIEF DESCRIPTION OF THE DRAWINGS

The following figures depict certain illustrative embodiments of the methods and systems described herein, where like reference numerals refer to like elements. Each depicted embodiment is illustrative of these methods and systems and not limiting.

FIG. 2C depicts one embodiment of a method for determining or ensuring a biometric chain of provenance;

FIG. 11 depicts an embodiment of a mobile access control device acquiring imagery of at least a portion of a face;

FIG. 28 depicts one embodiment of a system for determining or ensuring a biometric chain of provenance;

FIG. 29 depicts one scenario in which a chain of biometric providence is confirmed by one embodiment of the present system;

FIG. 30 depicts one scenario in which a chain of biometric providence is denied by one embodiment of the present system;

FIG. 31 depicts another scenario in which a chain of biometric providence is confirmed by one embodiment of the present system;

FIGS. 32 and 33 depict certain scenarios in which a chain of biometric providence is denied by an embodiment of the present system.

DETAILED DESCRIPTION

Figure 1A:
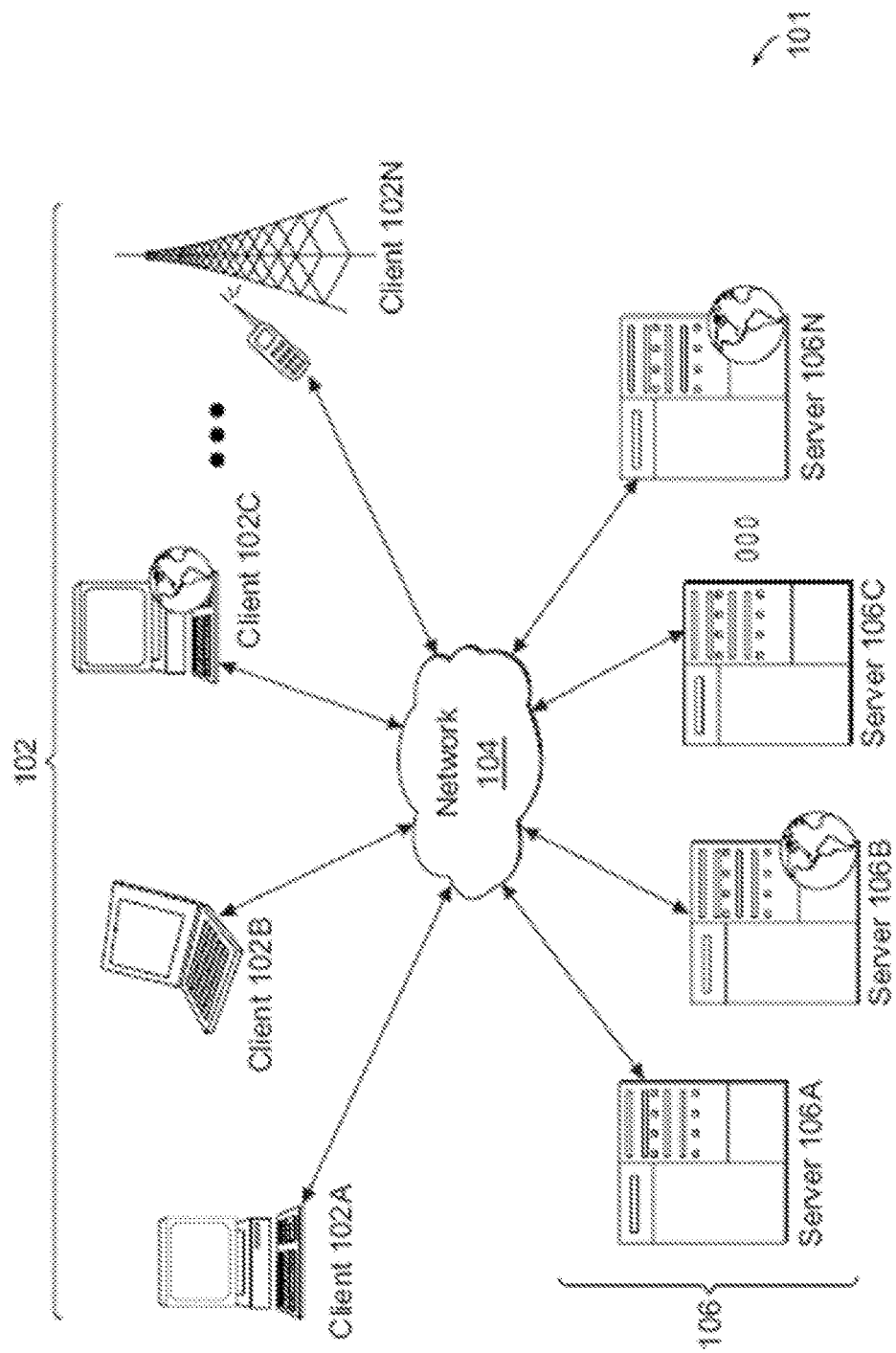
FIG. 1A is a block diagram illustrative of an embodiment of a networked environment with a client machine that communicates with a server.

Before addressing other aspects of the systems and methods for providing or ensuring a biometric chain of provenance, a description of system components and features suitable for use in the present systems and methods may be helpful. FIG. 1A illustrates one embodiment of a computing environment 101 that includes one or more client machines 102A-102N (generally referred to herein as "client machine(s) 102") in communication with one or more servers 106A-106N (generally referred to herein as "server(s) 106"). Installed in between the client machine(s) 102 and server(s) 106 is a network.

In one embodiment, the computing environment 101 can include an appliance installed between the server(s) 106 and client machine(s) 102. This appliance can mange client/server connections, and in some cases can load balance client connections amongst a plurality of backend servers. The client machine(s) 102 can in some embodiment be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

The client machine 102 can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop.

The computing environment 101 can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. Some embodiments include a first server 106A that receives requests from a client machine 102, forwards the request to a second server 106B, and responds to the request generated by the client machine 102 with a response from the second server 106B. The first server 106A can acquire an enumeration of applications available to the client machine 102 and well as address information associated with an application server 106 hosting an application identified within the enumeration of applications. The first server 106A can then present a response to the client's request using a web interface, and communicate directly with the client 102 to provide the client 102 with access to an identified application.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; 3G; 4G; or any other protocol able to transmit data among mobile devices.

Figure 1B:
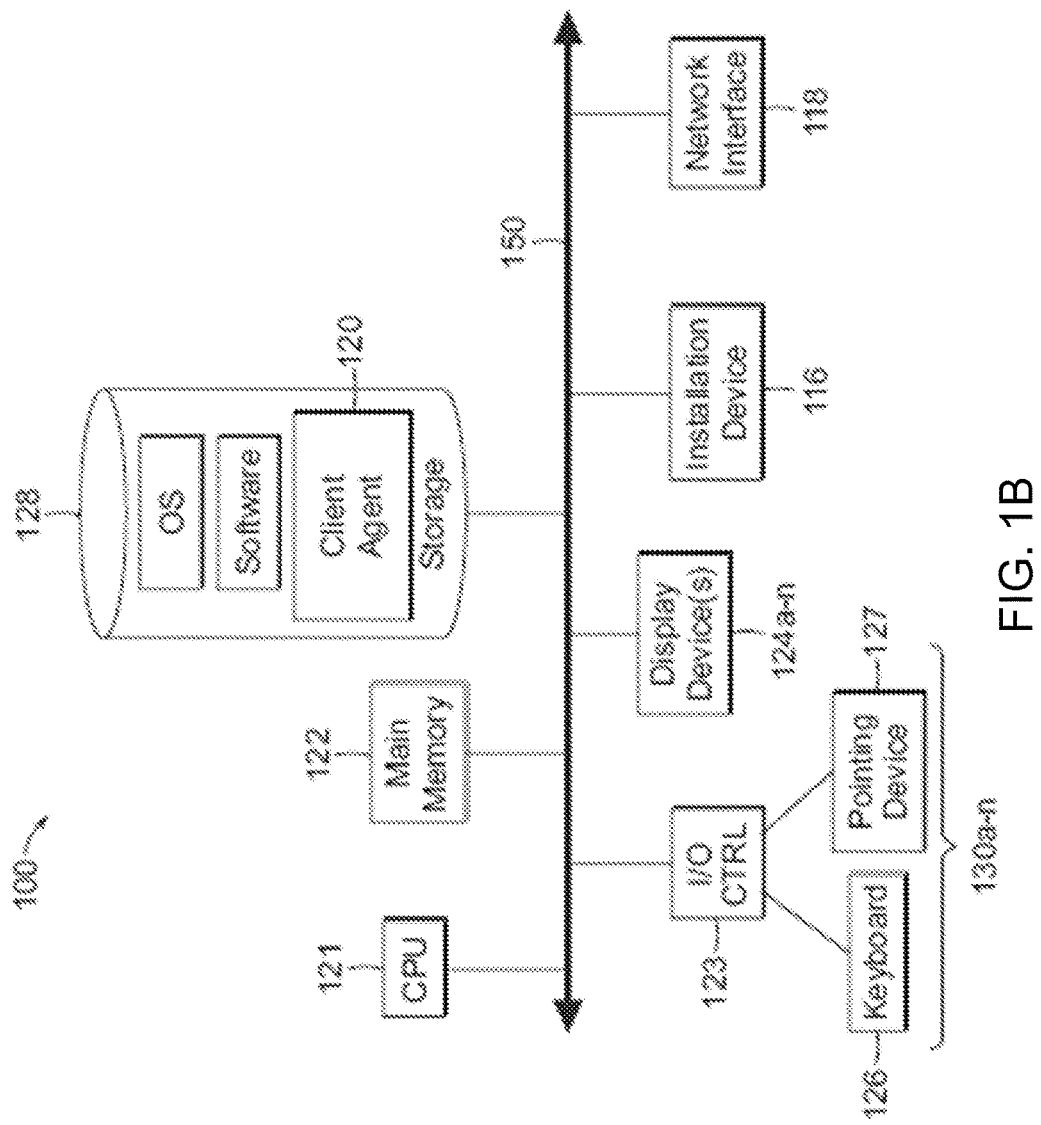
FIGS. 1B and 1C are block diagrams illustrative of embodiments of computing machines for practicing the methods and systems described herein.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 1C:
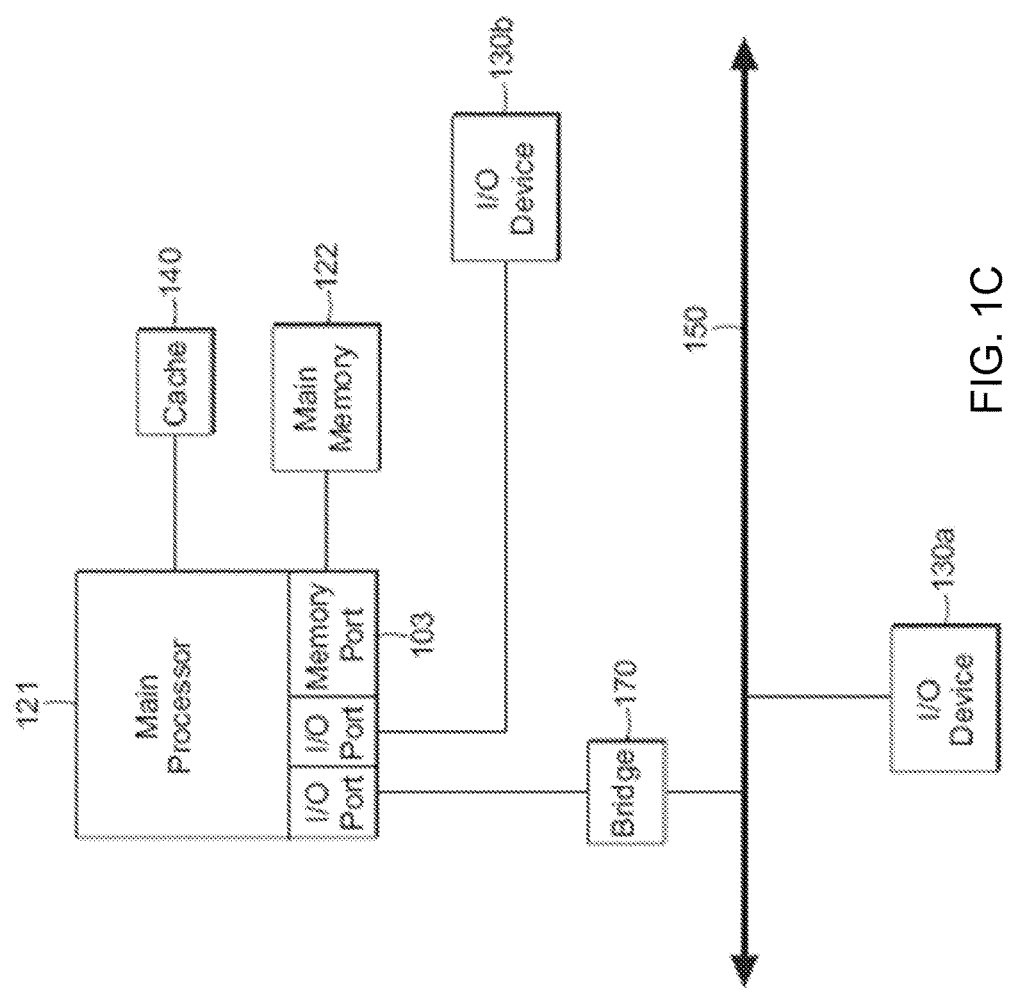

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some embodiments the computing device 100 can include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121 may in some embodiments access available memory as a global address space, or in other embodiments, memory within the computing device 100 can be segmented and assigned to a particular core within the processing unit 121. In one embodiment, the one or more processing cores or processors in the computing device 100 can each access local memory. In still another embodiment, memory within the computing device 100 can be shared amongst one or more processors or processing cores, while other memory can be accessed by particular processors or subsets of processors. In embodiments where the computing device 100 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 100 includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 100, in some embodiments, can include an image processor, a graphics processor or a graphics processing unit. The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 100 can include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a MicroChannel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or SynchBurst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 121 that can access the main memory 122 via: a system bus 150; a memory port 103; or any other connection, bus or port that allows the processor 121 to access memory 122.

One embodiment of the computing device 100 provides support for any one of the following installation devices 116: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

The computing device 100 may further include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can execute any operating system, while in other embodiments the computing machine 100 can execute any of the following operating systems: versions of the MICROSOFT WINDOWS operating systems; the different releases of the Unix and Linux operating systems; any version of the MAC OS manufactured by Apple Computer; OS/2, manufactured by International Business Machines; Android by Google; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook, a tablet; a device of the IPOD or IPAD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA); any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; an Android phone; or any other handheld mobile device. Having described certain system components and features that may be suitable for use in the present systems and methods, further aspects are addressed below.

Having described embodiments of computing devices and environments that may be suitable for the methods and systems for tracking the provenance of an individual between disparate transactions that they perform, certain embodiments of the methods and systems will be described in detail. The individual may be involved in one more logical and/or physical access transactions. Embodiments of the present systems and methods may use acquisition and/or matching of potentially disparate biometrics at each point of transaction. In some embodiments, the present systems and methods may provide means to ensure the provenance of each step within each transaction and/or between each transaction.

Figure 2A:
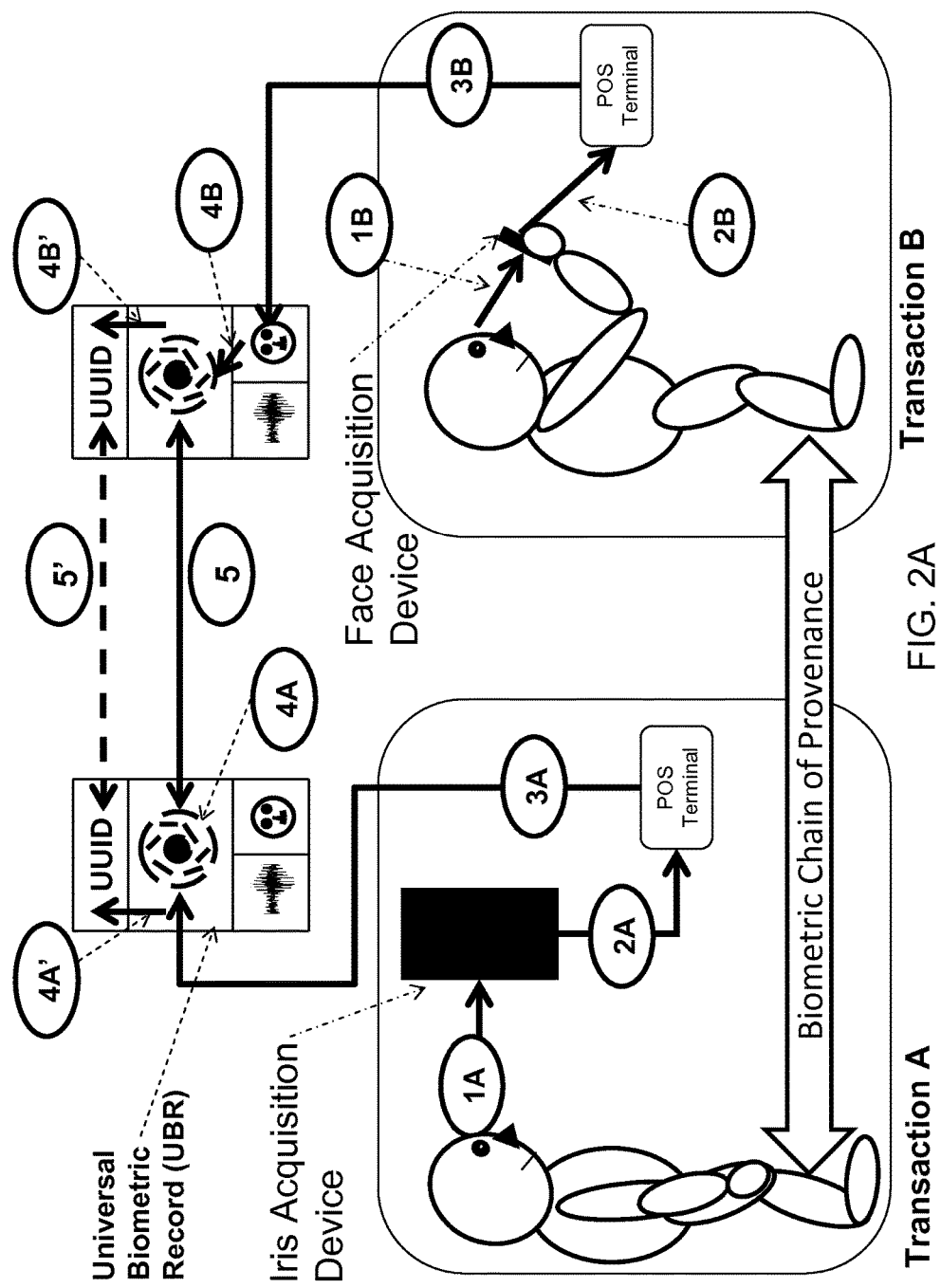
FIG. 2A depicts one embodiment of a system for determining or ensuring a biometric chain of provenance.

Certain embodiments of the present methods and system may counter fraudulent activity by using 1) the ability to track a particular individual to a transaction, and/or 2) the ability to track one transaction to a second transaction. Biometrics is the field of measurement of human characteristics, and the acquisition and/or matching of biometric data can be a component in such a process. FIG. 2A depicts one embodiment of a method for ensuring integrity of acquired biometrics for linking to one or more transactions. An individual shown on the left of the figure performs a Transaction A. On the right of the figure, either the same or a different individual may attempt to perform a Transaction B. Integrity may be ensured via a biometric chain of provenance (BCP) between transactions A and B, which may provide transaction-related information after-the-fact or in real-time, and may depend on whether the individuals are in fact the same or different. In Transaction B, as illustrated in FIG. 2A, the customer may use a mobile device to acquire biometric data. The customer may use his/her mobile device to communicate to a static device such as Point of Sale (POS) terminal.

In some embodiments, the first link in Transaction B for the BCP is associating the acquisition of the biometric of the user to the mobile device. This may involve a specific physical location and/or a particular time (Link 1B). For example, provenance of the biometric acquisition may be less assured if the biometric was acquired far (e.g., 100 m) from the point of sale terminal rather than in front of checkout staff. Various methods for performing this as well as other provenance checks are described later.

In certain embodiments, the second link in Transaction B for the BCP may involve associating the mobile device to the POS terminal at a specific location and time (Link 2B). This may be governed by the physics of the communication method between the mobile device and the POS terminal and/or other methods. Embodiments of such methods are described later.

In some embodiments, the third link in Transaction B for the BCP may involve association of the biometric information acquired during the transaction with a Universal Biometric record (UBR). In certain embodiments, the UBR may be stored locally at the site of the transaction or at a back-end server, for example. The UBR record may include multiple biometrics acquired at a time of customer enrollment or registration into the system. This attempted association can be done using a combination of one or more of: i) using a unique ID number of the mobile device to index into a Unique Universal Identifier (UUID) number that may be part of the UBR, ii) using the biometric data that has been acquired and to perform biometric matching on a database containing a plurality of UBR records or with a single UBR record if used in combination with the indexing method, and iii) acquisition of the biometric data without real-time matching for later forensic and provenance analysis, either by automatic processing or human analysis.

In some embodiments, if an automatic biometric search is performed for biometric matching, then depending on the accuracy of the biometric used on the mobile phone, such an automatic search can yield many matches (e.g., face biometric), can yield a unique match result (e.g., the iris), or can yield no matches. In the case shown in FIG. 2A, Transaction B, the face data may be acquired (e.g., not matched) and the unique ID of the mobile phone may be used to index into a UUID number and the associated UBR record, thereby creating provenance link 3B.

We have now described links 1B, 2B, 3B in the BCP. We next consider the other end of the BCP—links 1A, 2A, 3A which relate to Transaction A. These links may be performed by a similar approach as in links 1B, 2B, 3B, although another embodiment of the methods and systems is illustrated for Transaction A. Specifically, the biometric device can be a static device and not a mobile device. The device may capture iris imagery and not face imagery, for example. In this embodiment, link 3A may link the acquired iris biometric to the iris biometric component of the UBR.

In some embodiments, a step in confirming or rejecting the BCP comprises associating the candidate UBR records that have been located in Transaction A and B by search or by indexing, and checking the integrity of the provenance, either in real-time or after-the-fact for reasons of detection, deterrence, and prosecution. In certain embodiments, the attempted association can be done in one or more ways: i) comparing the UUID numbers of Transaction A and B and checking for a match, and/or ii) using the biometric data recovered or acquired during Transaction A and B and performing a match. The first method may be performed by first associating Transaction A to the UUID of the indexed record identified for Transaction A (Link 4A'), and similarly for Transaction B (Link 4B'). Then the recovered UUID numbers for Transaction A and B may be compared (Link 5'). The second biometric match method can be simple if the biometric used for Transaction A and B are the same. In such cases, those biometrics can be compared directly with each other, or with the reference biometric acquired at a time of registration/enrollment. However, the approach may be more complicated if Transaction A was performed with one biometric while Transaction B was performed with another biometric. In some embodiments, we may address this by choosing to match a biometric that is contained in both UUID records since not all biometric fields/structures in the USB may be populated. The biometric matching may select at least one biometric that was acquired at the time of either Transaction A or B, since this comprises very recent biometric information rather than just biometric information captured at the time of registration. This method of choosing overlapping biometrics may be represented by links 4A and 4B respectively for each of Transaction A and B. In one embodiment, it may be determined that the iris is the biometric in common with the two UBR records, and in the case of Transaction A, iris data was in fact acquired. Then, the chosen overlapping biometrics for Transaction A and B may be compared in Link 5. In this way, one biometric used in Transaction A can be biometrically associated to another biometric used in Transaction B using the UBR. This allows multiple biometrics to co-exist in the biometric chain of provenance.

In some embodiments, it may be difficult to acquire facial biometric data on a mobile device because the camera on the device is rear-facing and not front-facing, We may address this by placing a (e.g., small) mirror module at the point of transaction such that when the camera of the mobile device is placed near it, images of the user may be reflected and captured. This can be achieved, for example, by using a first mirror in the module that is oriented at a 45 degree angle to the camera's optical axis and a second mirror that is oriented at 90 degrees to the first mirror.

In some embodiments, it may be useful to acquire a second facial biometric from a different geometric perspective than the first facial biometric. For example, the first facial biometric may be acquired from the mobile device while the second facial biometric may be acquired from an existing security camera located in the ceiling for example, near the point of transaction, or from a webcam on the user's laptop. One possible advantage is that the second facial biometric can be configured to have a wider field of view of coverage than the first facial biometric and can capture context of any fraudulent activity. At the time of the transaction, images and/or video of the transaction can be acquired from both the first and second facial biometric cameras simultaneously. In order to reduce storage space for the biometric data for the transaction, imagery can be acquired from the second facial biometric camera from a (e.g., small) cut-out region covering the region near the transaction (e.g., point of sale). In some embodiments, the approach of capturing the same biometric from a different geometric perspective makes it harder to spoof the biometric capture. This is because a potential fraudster will likely need to plan the spoof from two perspectives simultaneously. In general, such an approach can add an extra layer of security, and biometric data from the different geometric perspectives can be checked to ensure the integrity of acquired biometrics linked to a transaction.

Figure 2B:
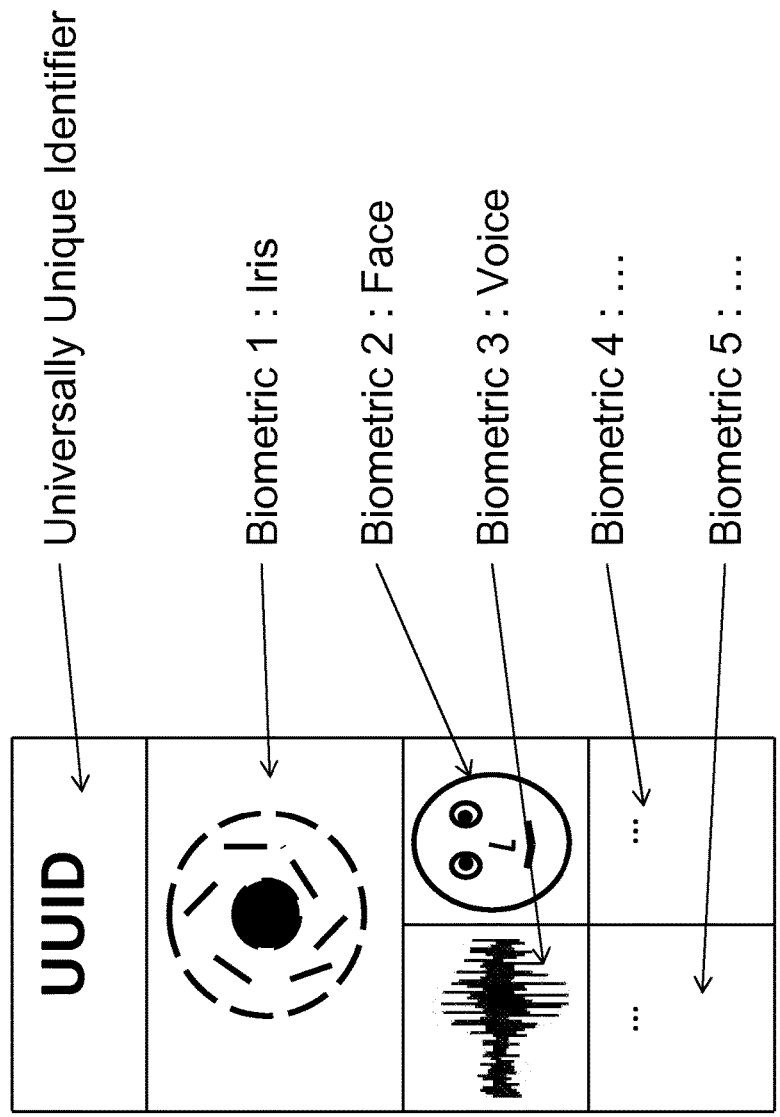
FIG. 2B depicts one embodiment of a universal biometric record used in the present systems and methods.

FIG. 2B shows a more detailed view of the UBR. The UBR may comprise multiple biometric records acquired at a time of registration/enrollment for a particular customer, for example, face, iris, voice, palm and fingerprint biometrics. The UUID may be a Universal Unique Identifier that is a number or identifier created to be unique over a population of customers or individuals. The UBR can contain an index to traditional personal information such as name, address and account number information.

Each link in the biometric chain of provenance may be subjected to a set of provenance rules. If any of those rules are breached within any link, then provenance may not be assured. In such a case, the transaction may be flagged and not allowed to proceed, or further forensic analysis may be performed on related BCPs to investigate further. FIG. 2C shows one embodiment of a summary of a BCP process. The column on the left shows certain steps in the provenance chain, as described above. The column in the middle gives a description of the link, and what associations are tested. The column on the right shows the result of the provenance check for that particular link. If all rules for all links pass successfully, then as shown at the bottom of the middle column, the concatenation of all the inferences from each link can lead to the conclusion that, in this case, the person performing Transaction A is the same as the person performing Transaction B.

Figure 2D:
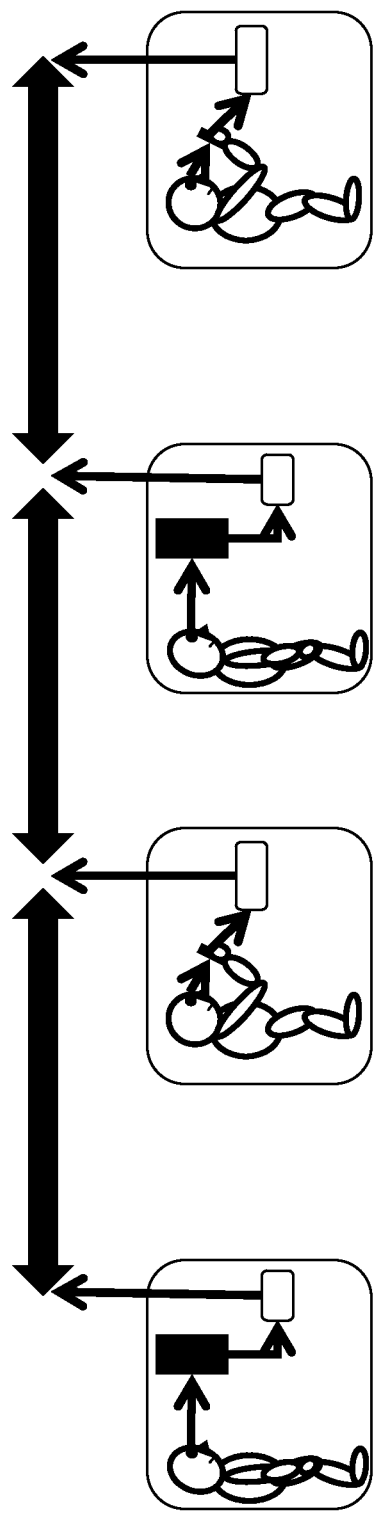
FIGS. 2D and 2E depict examples of a chain or network of biometric provenance established using embodiments of the present systems and methods.
Figure 2E:
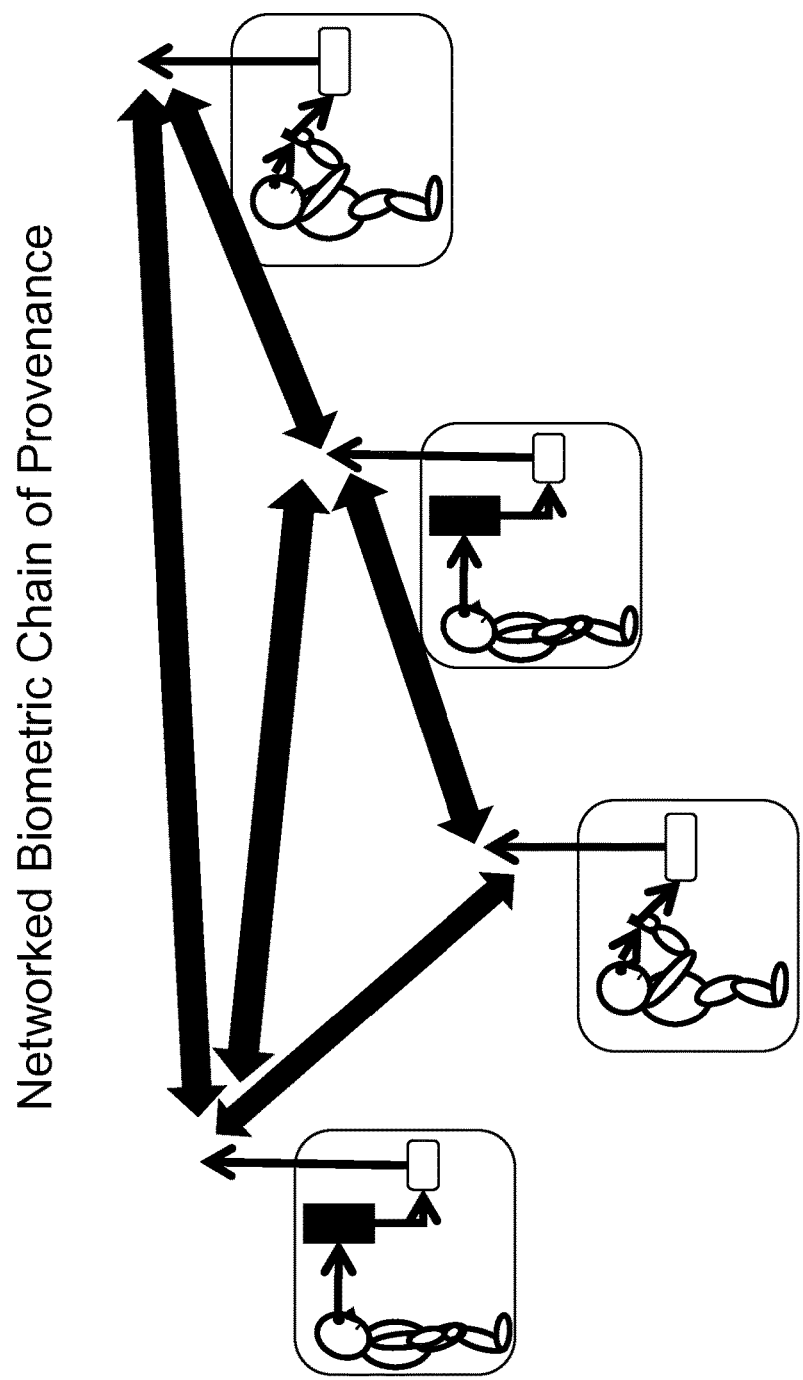

The BCP can be performed not just between two transactions, but between multiple serial transactions or across a network of transactions where cross-validation of transactions may be performed in real-time or forensically. For example, FIG. 2D shows how the BCP may be extended to validate transactions over a chain of multiple (e.g., four) transactions. FIG. 2E on the other hand, shows how the BCP may be extended to incorporate a network of transactions. Additional confirmation may be provided by validating against additional transactions. Such validation may take longer, but can provide added confirmation for higher value transactions. For example, if the transaction involves buying a coffee, then it may be appropriate to check the BCP for one or two transactions, for example appropriate to such a low-value transaction. However, if the transaction involves a significant purchase such as a car or house, then all or a substantial number of available BCP checks can be performed for both low and high value transactions previously performed, to check for consistency of the BCP.

One test of the Biometric Chain of Provenance may be that biometric chains of provenance should not overlap unless the same person is involved in the transaction(s). In other words, a further test of the BCP is the lack of matching to other BCPs. While it may be processor-intensive to test all possible combinations of matches of BCPs, such a process can be performed (e.g., by a biometric validation or integrity engine) as a background computing process and not on a transaction-by-transaction basis. Anomalies may be reported as they are detected.

We next consider particular embodiments of methods for ensuring the provenance of biometric information between the individual, a device (static or mobile) that collects the biometric data, any point of sale terminal that communicates to the said device, and the rest of the transactional system. For example, this may be in the context of everyday environments, such as a busy check-out line with multiple people, or in a mobile unattended environment.

One advantage of biometric systems over token-based systems can be that biometric systems give evidence of who the person is, rather than evidence of what they carry (e.g., an identification token). However, there are many cases where the biometric authentication needs to be associated to a particular location or access point or point of sale location or even another mobile location. This is more easily achieved if the biometric device is fixed to the wall, for example, since then the biometric read is inherently linked to the physical location. However it may be cost-prohibitive in many cases to deploy biometric systems in such a large number of locations. Some embodiments of the present methods allow mobile biometric devices to be linked to other mobile or static devices, while maintaining a level of security similar to or attained by fixed biometric devices.

In some embodiments, a mobile biometric device may be suitable. For example, the iris biometric is known to be highly accurate and can be acquired quickly and easily by a user. However, when trying to perform a physical transaction or access control function, a set of unique issues are posed. For example, successful matching of the user's biometric using a mobile biometric device may provide no evidence that the person who used the biometric device is also the person who actually executes the physical transaction or access control function. For example, a user with a biometric device could stand by a point of sale or access control gate, use the biometric device, and a person without any such device could execute the access control or point of sale function. In another example, two users with two mobile biometric devices could be standing next to each other at an access control point and the access control point is unaware of which device physically is relevant for the desired function or transaction.

In one embodiment, the present method addresses at least some of these issues using for example two components. In a first component, the method leverages on the spatial geometric relationship between a network of one or more mobile authentication devices and/or static nodes. This helps determine where the mobile devices and/or nodes are with respect to each other at any particular moment in time. In a second component, the method may employ ways to link the physical action of reading the biometric to the geometrical relationship discussed in the first component.

In some embodiments, in the first component, we may begin by estimating the location of the mobile authentication device or the node with respect to other nodes or devices. In a first illustrative aspect, a GPS module located on the mobile device or static node can be used to provide an approximate location of the device or node for example. A wireless link between the mobile device and one or more other mobile devices or nodes may allow the GPS location of the device to be transmitted to the other. Geometrical relationships between each device or node can then be computed. For example, the Euclidean distance between the device and node can be computed as follows:

$$D=\text{sqrt}((X1-X2)^2+(Y1-Y2)^2+(Z1-Z2)^2),$$

Where D is the distance between device or node 1, and device or node 2, and the location of device 1 is given by (X1,Y1,Z1) and the location of device 2 is given by (X2, Y2,Z2). More generally, D can represent a vector difference that represents just Euclidean distance, or can include other attributes such as signal strength for example. One method for disambiguating which mobile biometric device is relevant to a particular fixed node or other biometric device may include performing rules upon the computed vector distance D. For example, in some embodiments, if the biometric device is being used for a function such as access control, then the following steps may be employed:

Compute distance D_io between the mobile biometric device or node N_i of interest and all other relevant mobile biometric devices or nodes N_o If D_io cannot be computed between any device pair N_i and N_o due to any reason, then set D_io=infinity.

Compute D_io_min=the minimum distance to device N_i computed over all N_o, and store the device number N_o_min=N_i corresponding to this minimum distance. If no D_io can be computed from device of interest N_i to any N_o then set D_io_min=infinity.

Compute D_io_min2=the second minimum distance to device N_i computed over all N_o. If (D_io_min2−D_io_min) is less than D_tolerance, then set D_io_min=infinity. This means that if two devices have almost the same distance, then rather than choosing one over the other, in some embodiments, the system may choose neither to prevent the wrong person being authorized to perform the transaction or function. For example, the person who is not supposed to be performing the function or transaction may want to step back and/or the correct person may want to move forward. D_tolerance may be a function of human factors and security protocols. For example, in some applications it may be important that a clear separation between people can be observed on video cameras for later analysis. We have found acceptable solutions, in some embodiments, when D_tolerance is less than 3 meters.

Compute SPATIAL=(D_io_min<D_allowed)?, where D_allowed is the allowable distance that a solution allows between the biometric device of interest and a relevant other biometric device and/or node. For example, in an access control function, it may be typically unacceptable to open up a gate when a person is more than a few human strides from the gate itself. Therefore an appropriate distance for access control or a financial transaction function may be approximately 1 meter. For other applications, such as when a user is in a vehicle, then the distance may be increased to 3 meters for example.

The output of this function may include the variable SPATIAL, which is 0 if no device is found to be within the allowed range, and 1 if device N_o_min is within range of the allowable distance, for example. The device N_o and N_i can then proceed to communicate wirelessly between each other, once they have selected each other.

There are various other methods for computing the distance D_io between the mobile biometric device or node N_i of interest and all other relevant mobile biometric devices or nodes N_o. The illustrative approach using GPS above may not work well indoors due to lack of satellite signal strength, and also its precision may not be high. An alternative approach is to use a contactless RF (Radio Frequency) approach. This may have the advantage of being precise over very short distances although it may be inaccurate at longer distances due to multiple reflections. For example, signal strength between device N_o and N_i can be computed, and fed through a lookup table that has been populated previously from empirical tests, in order to relate distance to signal strength. In its simplest form, this distance metric can almost be binary, such that it is a contactless reader whereby the user has to place device N_o against N_i for the signal strength to be sufficiently large such that the devices can communicate. The algorithm described above may automatically take into account the condition when devices are too far away for a contactless reader to communicate.

In some embodiments, another approach is to use time-of-flight using radio frequency signals between device N_i and N_o. A signal may be sent from one device to the other and then back again using a standard radio link method such as Bluetooth. The signal itself may carry the device ID D_i so that it may be known which signals are sent from which devices. The time it takes for the signal to be received can allow a distance to be computed. For example, $$D\_io = 0.5 \times C/(T\_io - T\_p)$$

Where D_io is the distance between devices N_i and N_o, C is the speed of light, T_io is the time computed from sending the signal and receiving it, and T_p is the processing time it takes to send a return signal back. The factor of 0.5 is used since a signal is being sent both ways between the device and this accounts for that. The factor T_p is subtracted from T_io so that processing time does not interfere with the distance measurement. Processing time may be independent of distance between devices, and can be computed by setting devices N_i and N_o at a known distance apart, by measuring T_io, and then by rearranging the variables in the equation above to compute T_p. In some embodiments, The RF time-of-flight approach can work reliably at long and short distances. However, in some embodiments, it may require that very precisely-tuned electronics be used, since T_io may be measured in nanoseconds and not milliseconds.

In some embodiments, an audio-based approach may be used rather than radio frequency signals. Audio can travel through air many orders of magnitude slower compared to radio frequency (approximately $3\times10^2$ m/sec compared to $3\times10^8$ m/sec) and this can mean that corresponding electronics need only work at millisecond precision. There are several ways that audio can be implemented. One method is similar or identical to the method described above for RF, except that audio is used. For example, a loudspeaker on one device may send a signal, and a microphone on the other device may receive the signal. A loudspeaker on that device may send another signal, after which the first device receives the other signal using a microphone for example. Several microphones can be used in a phased-array so that sounds from the expected direction of use are amplified while those from other directions are minimized or rejected. This can improve noise rejection capabilities. In some embodiments, ultrasound above 20 KHz is used so that the audio signal is inaudible to humans. The speed of sound can vary quite widely with temperature, however this may not matter in the process of selecting which device N_i is closest to N_o, since all devices in the vicinity of N_o are subject to the same temperature. Once a device has been selected, then there is typically enough tolerance in the specifications for D_allowed to accommodate such variations in C_sound due to temperature variations.

In certain embodiments, an approach is to use both audio and radio signals to perform ranging. This has an advantage that an audio signal may be sent in one direction, which can reduce the processing complexity. For example, a radio signal may be sent wirelessly between device N_o and N_i. At the same time, an audio signal may be sent. The time difference between arrival of the radio signal and the audio can be used to compute the distance. This distance, in some embodiments, may be expressed as:

$$D\_io = C\_sound/(T\_audio - T\_RF - T\_p)$$

Where C_sound is the nominal speed of sound, T_RF is the time when an RF signal from a device was received, and T_audio is the time when the audio signal was received.

As discussed earlier, embodiments of the present methods may link the physical action of reading a biometric to the geometrical relationship recovered above. More specifically, the issue we are addressing here is that while the above-mentioned methods may associate one device to another, they do not specifically associate the act of acquiring the biometric to the desired transaction or function. For example, a mobile device may acquire the user's biometric at one instant in time as they are physically far from another device or node, and then at a later time (measured in seconds for example) distance is computed as discussed above. The time difference between these two events may allow one or more users to move nearer or farther away from each other, thereby resulting in an incorrect estimation of the geometrical relationship between devices at the time that it matters most. Embodiments of the present methods and systems address this in several ways. For example, in one embodiment, a ranging module or device may perform distance calculation within a time difference T_diff of a biometric read. T_diff may be determined such that any movement of a person or device in that time instant will be sufficiently small that it does not affect the outcome of the geometrical calculations described herein. T_diff may be determined as a function of human factors such as human walking speed. In some embodiments, T_diff<1 second is a preferred value.

In some embodiments, the methods and systems may optionally require that the user hold on to the device between the time that a biometric is read and the geometrical calculation is performed. This can ensure that locating the device also locates the user, for example within the accuracy of the length of the arm of the user. This can be achieved in many ways. For example, a user can press and hold a button on the device between the time that a biometric capture is performed and the ranging calculation is completed.

As discussed earlier, embodiments of the present systems and methods may incorporate one or more of the following to counter fraudulent activity: 1) the ability to track a particular individual to a transaction, and 2) the ability to track one transaction to a second transaction. We now describe another embodiment of the means to track a particular individual to a transaction. Here, we use an access-control transaction as an illustrative example, although this can also be a point-of-sale or other transaction.

In existing personal access control devices such as that disclosed in "A System for Non-intrusive Human Iris Acquisition and Identification", K. Hanna, R. Mandelbaum, L. Wixson, D. Mishra, and V. Paragano, International Association for Pattern Recognition Workshop on Machine Vision Applications, pp 200-203, Tokyo, Japan, 1996, there is typically a biometric access control device at each portal or entrance. Other biometric access control devices include fingerprint recognition systems, and face recognition systems. However one problem is that biometric access control devices can be expensive, can require complex installation depending on the system, and can require costly maintenance. In addition, if a particular person for any reason cannot use the biometric access control device (for example, their record is not located in the device or they are unfamiliar with how to use the device), then they can delay an entire line of people behind them trying to gain access to a facility, for example.

Figure 3A:
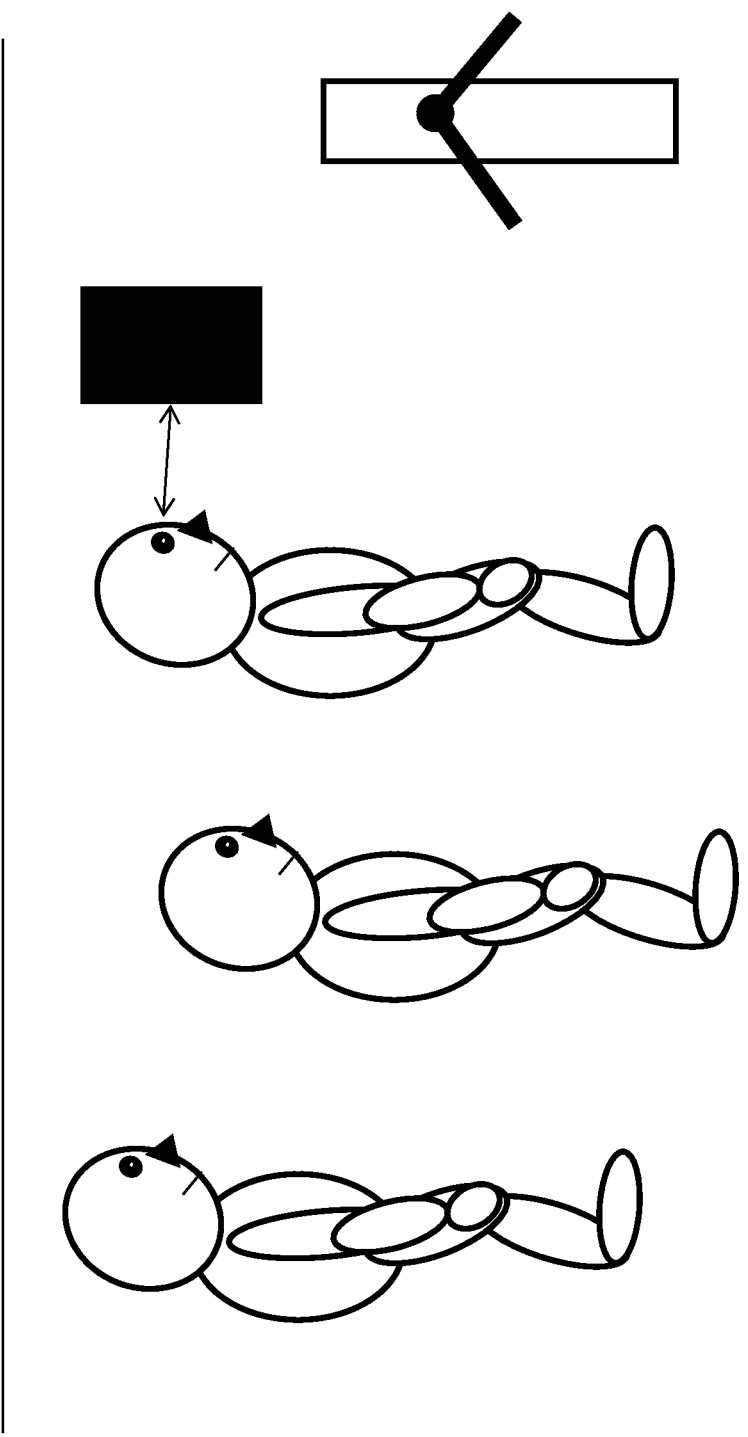
FIG. 3A depicts an embodiment of the present system providing access control to one or more users.
Figure 3B:
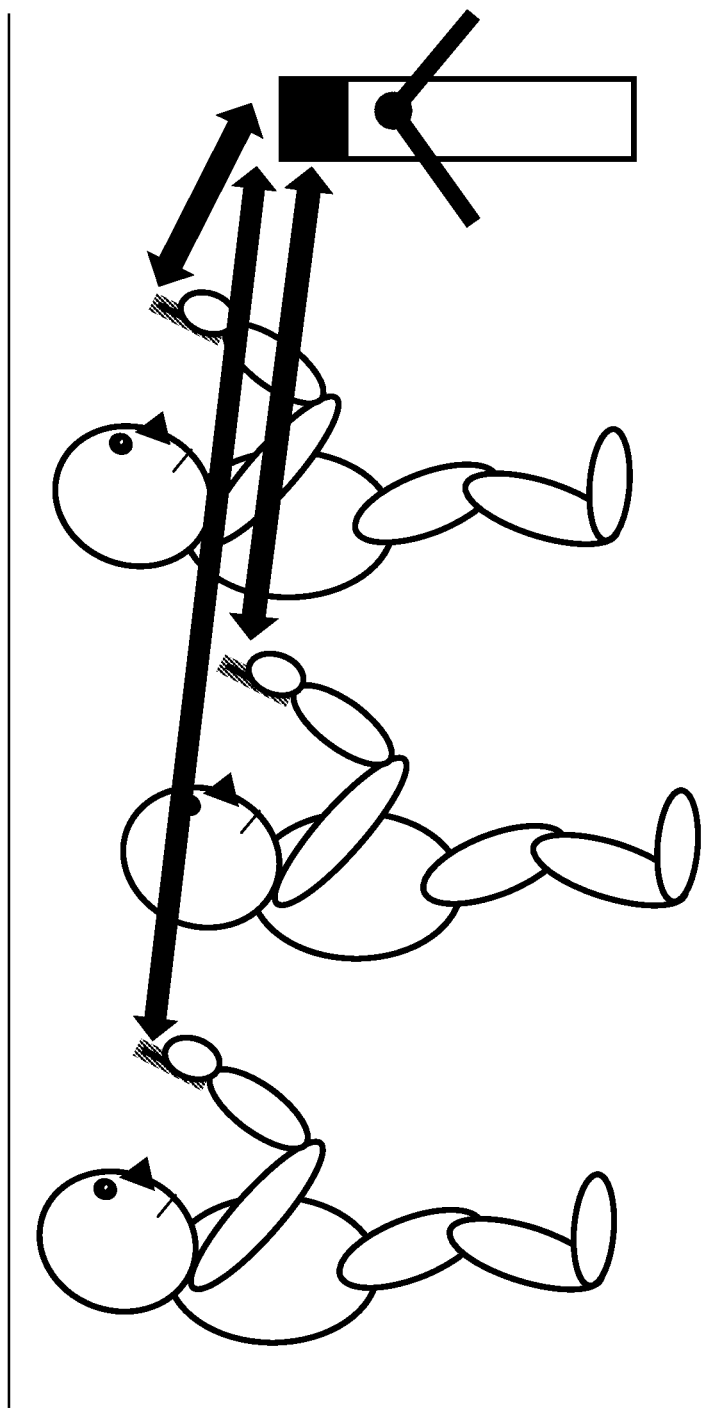
FIG. 3B depicts one embodiment of the present system providing access control to each user.

FIG. 3B shows how this problem may be addressed in a particular embodiment of the present methods and systems. First, rather than having a single device at each portal (as shown in FIG. 3A), each user may have their own personal access control device (sometimes referred to as a biometric device or mobile biometric device). Each personal access control device may include a biometric capture or match module. A personal access control device may communicate with at least one transceiver module remote from the personal access control device, which may in turn communicate with an access node that is at the point of logical or physical access which may be at the same or different location to that of the transceiver module(s). There may be processing and/or mechanisms on the personal access control device and on the transceiver module, as described herein, to establish that the user holding the personal access control device desires logical or physical access to one or more specific access node(s) (to avoid confusion at an installation with adjacent turnstiles or devices for example). In some embodiments, there is processing and/or mechanisms, as disclosed herein, for establishing that the person who has successfully used the biometric capture or match module is the same person within the vicinity of said access node(s) at the moment of logical and physical access.

There may be several advantages of each user having their own personal access control device. First, there is no need to have a biometric access control device on or near the turnstile. Typically biometric access control devices have particular use cases and requirements for operation that are carefully controlled. Combining these human factor constraints with the human factor constraints of access point (e.g., turnstile) people-flow can be complex, and may require significant planning and cost for installation. The biometric access control device also typically requires maintenance by specialized staff. A personal access control device carried by the user on the other hand can be maintained remotely, by the user themselves for example. Moreover, the human-factors constraints imposed by the device usage and the turnstile entry are separated. Since the personal access control device is in the hands of the user, the user is more likely to be familiar with its usage. This in turn allows more rapid transit through an access point (e.g., turnstiles). If any user in line is having a problem using their device, he/she can simply step aside from the access point until he/she resolves the problem. In this way, the throughput of people through the access point may be maximized.

Figure 3C:
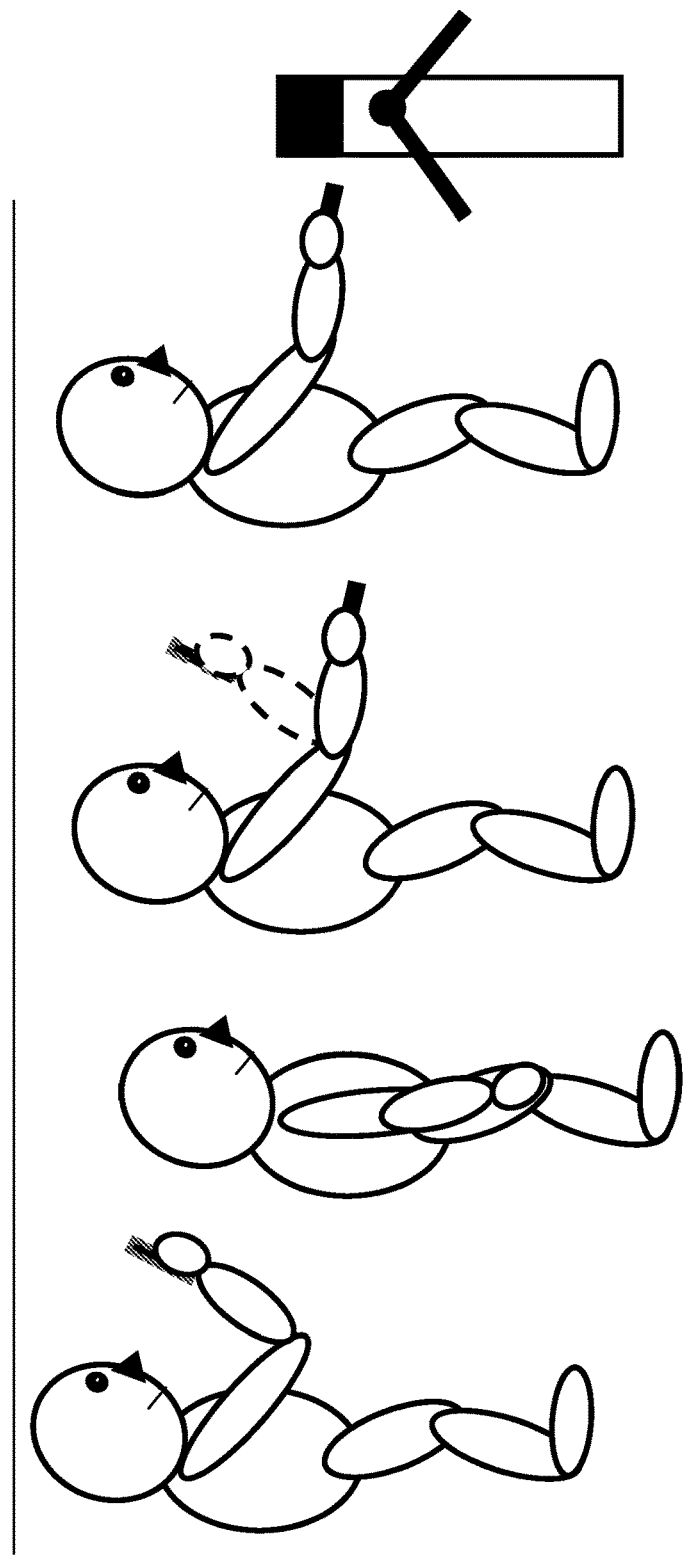
FIG. 3C depicts one embodiment of the present system comprising a mobile access control device.

FIG. 3C shows an example of the personal access control device usage. Users ahead of the line can use their own personal access control device before they reach their turnstile, as shown by the first and third person from the left in the line. The fourth person from the left has already used the personal access control device and is now at the front of the line by the turnstile. In this particular configuration, the person at the front of the line can swipe his personal access control device next or near to the transceiver module on the access node, as will be discussed later. In such an implementation, since the user does not use their personal access control device at the turnstile, there may be potential ambiguities in who actually is being allowed to enter the portal. For example, a user could use his/her personal access control device at a significant physical distance from the turnstile, thereby opening it, but an unauthorized user can step in and gain access. In another example where there are two access points or turnstiles next to each other, either turnstile could be actuated by the remote user, causing confusion and potential access by unauthorized individuals. These issues are addressed herein.

Figure 4:
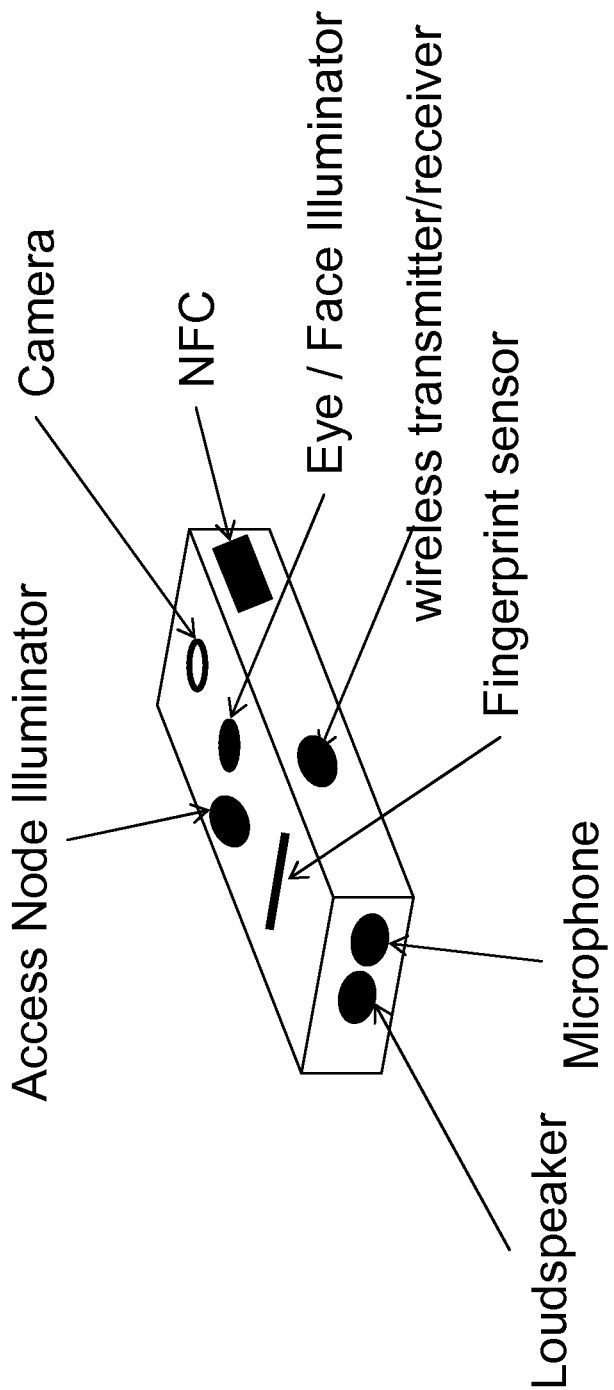
FIG. 4 depicts one embodiment of a mobile access control device of one embodiment of the present system.

FIG. 4 shows an example of a personal access control device used in the disclosure. Not all features may be required in all configurations in the disclosure. FIG. 4 shows an Access Node illuminator which may include a semi-directional infra-red light source, for example, much like that on a television remote control unit for communicating with the transceiver module, a loudspeaker and a microphone for communicating with the transceiver module, a camera for acquiring biometric information from the user such as face and iris imagery, an eye/face illuminator which may be in the visible or infra-red range, a wireless transmitter for communicating with the transceiver module, an near field communications (NFC) chip for communicating with the transceiver module, and in this example, a fingerprint sensor. There may also be a processor to perform certain steps described later in this description. There are many different types of wireless standards that can be used for near-range communication; for example the IEEE 802.11b standard.

Figure 5:
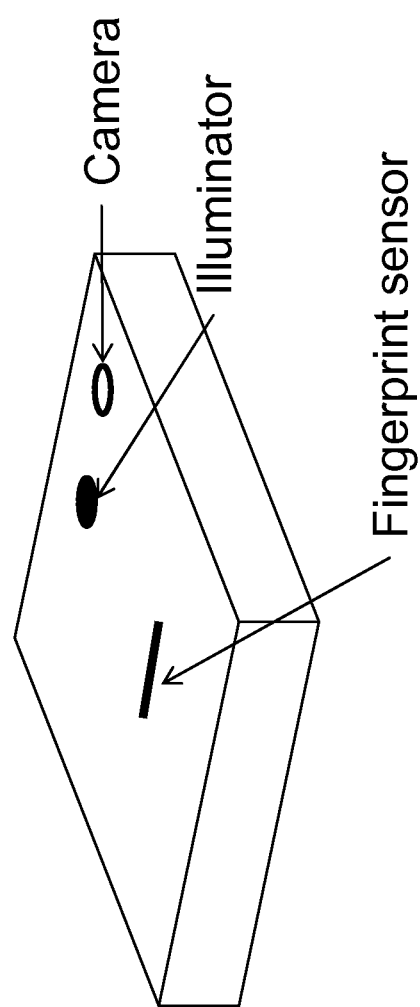
FIG. 5 depicts another embodiment of a mobile access control device comprising features that may be incorporated with a mobile phone or other personal device.
Figure 6:
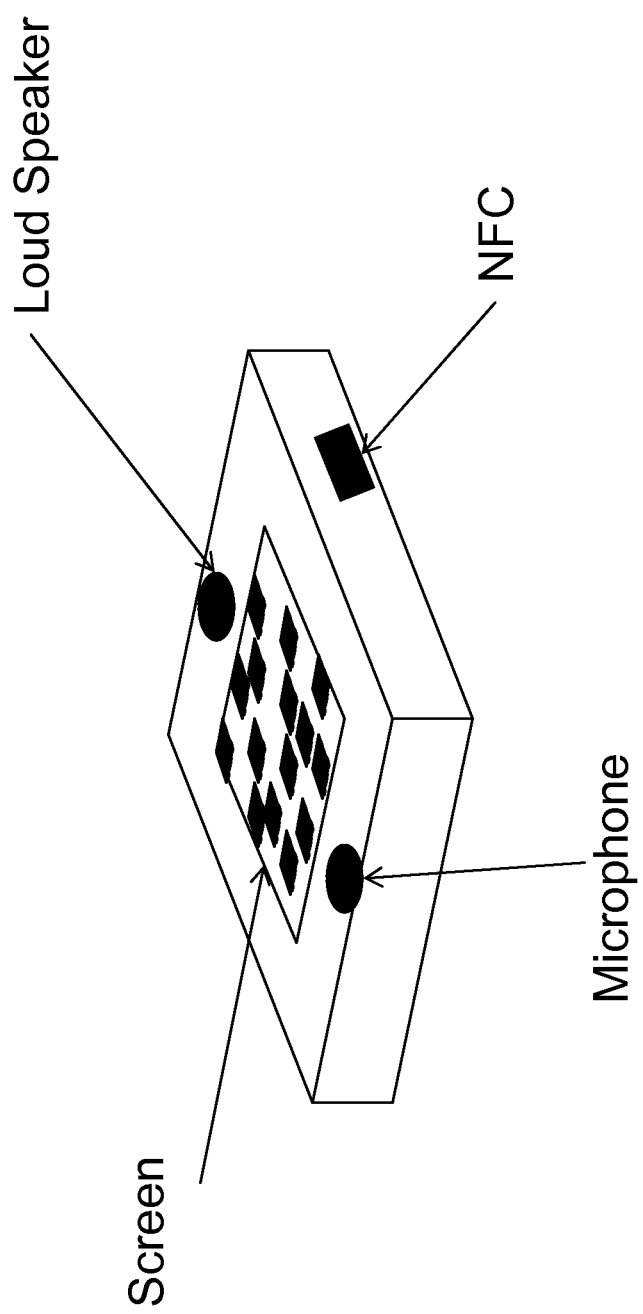
FIG. 6 depicts yet another embodiment of a mobile access control device.

FIG. 5 shows another example of a personal access control device configured to be on a mobile phone. In this configuration, which may augment certain standard mobile phone capabilities, on the back of the device there may be a camera, an illuminator to acquire biometric data such as facial and iris imagery, and/or also a fingerprint sensor. FIG. 6 shows one embodiment of the front of the personal access control device, showing a screen with a 2D bar code on it (as will be discussed later), a loudspeaker, a microphone and an NFC chip. Not all features may be required in certain embodiments as will be discussed below. There may also be a processor to perform certain steps described herein.

Figure 7:
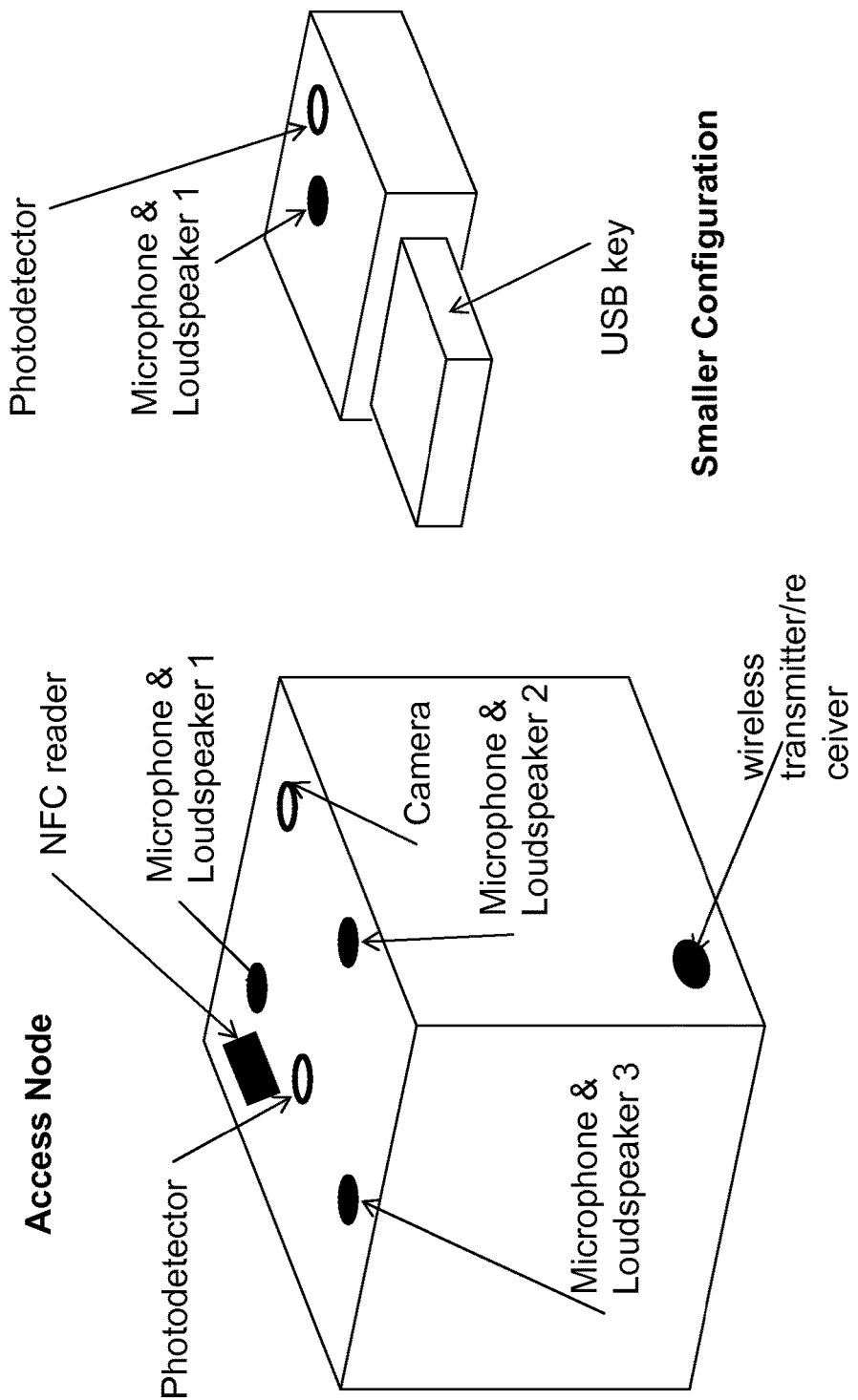
FIG. 7 depicts embodiments of a system for determining or ensuring a biometric chain of provenance in different form factors.

FIG. 7 depicts, on the left, one embodiment of an Access Node with a Transceiver module mounted on top with various sensor and transmitter components. Access nodes and transceiver modules can be mounted remotely from each other. Transceiver modules can include one or more of a photo-detector that is tuned to receive the signal of the semi-directional light source in the personal access control device as the user points the device towards the transceiver module, one or more microphones and loudspeakers to communicate via audio with the personal access control device, a camera, a wireless transceiver to communicate with the personal access control device, and an NFC receiver. FIG. 7 depicts, on the right, a USB version of the access node and transceiver module, comprising one or more of a microphone, loudspeaker and a photo-detector. In both configurations, there may be a processor that performs certain steps described herein. It is possible that the access node can contain similar or identical functions as the personal access control device, and in some embodiments, the access node may be a mobile device or device phone.

Figure 8:
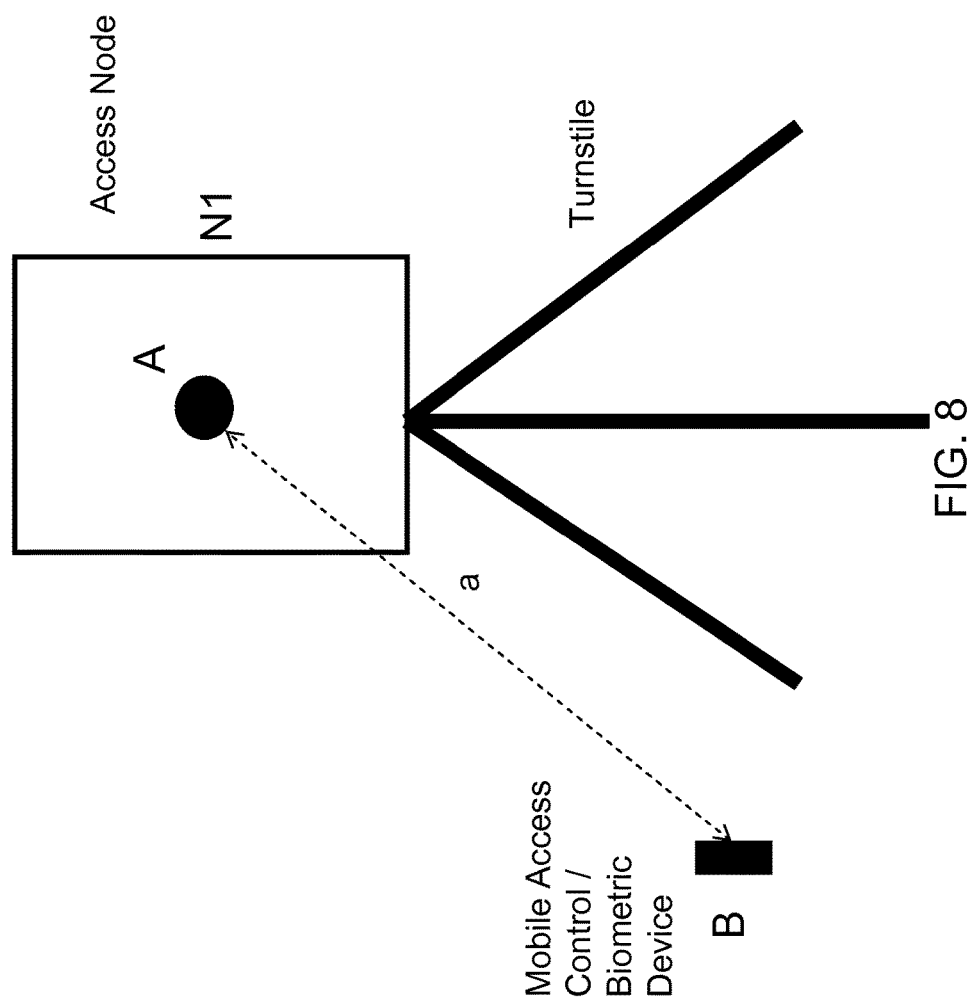
FIG. 8 depicts one embodiment of a system, from a top view, for determining or ensuring a biometric chain of provenance.
Figure 9:
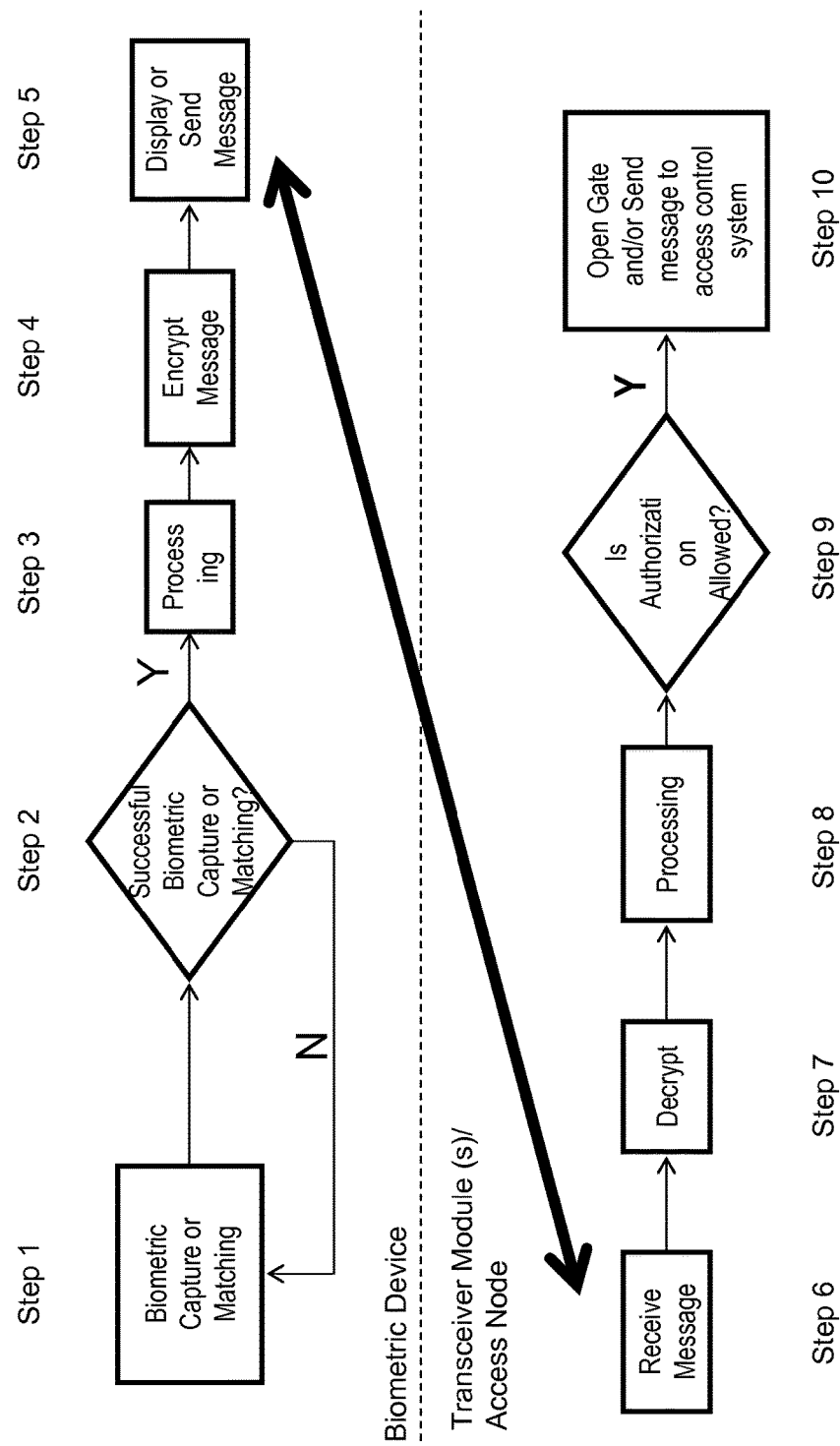
FIG. 9 depicts one embodiment of a method for determining or ensuring a biometric chain of provenance.

FIG. 8 shows one configuration where a personal access control device B is at a distance a from a transceiver module A on an Access Module N1 mounted on a turnstile. FIG. 9 shows a flow diagram of one embodiment of the methods disclosed herein. The first step may be biometric capture or matching. In the context of this disclosure, biometric capture can include the capture of information that indicates that a live person is in front of the personal access control device, and/or more traditional biometric matching whereby biometric data (a face, iris or fingerprint) is acquired and compared to reference data. In some applications, this step may be omitted and a device ID used in place of, or in addition to, the biometric data capture or matching. Such applications may be less secure but the user does not need to perform the step of having their biometric data acquired or matched. There are many examples of biometric matching; for example iris matching as disclosed by Daugman, "Biometric Personal Identification system based on iris analysis", U.S. Pat. No. 5,291,560.

In the methods and systems disclosed herein, it is possible to work with just the capture of biometric information (e.g., rather than matching) since the personal access control device itself has a unique ID (e.g., for identifying the individual). Moreover, the capture of the appropriate biometric information may be a sufficient deterrent to prevent an unauthorized user from stealing the device and using it. For example, the biometric capture module can ensure that the face of a live person is acquired and this data can be sent to the Access Node and stored so that in case of unauthorized access the biometric data of the unauthorized user can be available to help identify them. Alternatively or in addition, the camera at the Access Node can be used to capture imagery of users as they transit through the turnstile.

If the biometric capture or matching is not successful (for example as shown in step 2) then the user can try again. By virtue of the particular embodiment of the disclosure, this step can be attempted repeatedly before the user reaches the access point so that other users are not delayed, which would have been the case if the user had to perform the step at the turnstile itself. If the biometric capture or match is successful, processing may be performed (step 3). The processing on the personal access control device (step 3) and on the transceiver module (step 8) may establish: (i) that the user holding the personal access control device desires logical or physical access to one or more specific access node(s) (to avoid confusion at an installation with adjacent turnstiles or devices for example), and (ii) establishes that the person who has successfully used the biometric capture or match module is the same person within the vicinity of said access node(s) at the moment of logical and physical access. More details of the processing are discussed later.

After the processing is performed, the results of the processing may be encrypted (step 4) and may be displayed or sent from the Personal access control device (step 5) and received by one or more Transceiver Modules (step 6). Encryption may be desirable or necessary since otherwise the communication from the Personal access control device to the Transceiver Modules can be intercepted, monitored and/or replayed. The message may be decrypted (step 7) and then further processing (step 8) may be performed as discussed above. The results of the processing may then be checked to determine if authorization is allowed (step 9). If authorization is allowed, the turnstile may be opened and/or a message may be sent to an access control system which in turn opens the turnstile.

Figure 10:
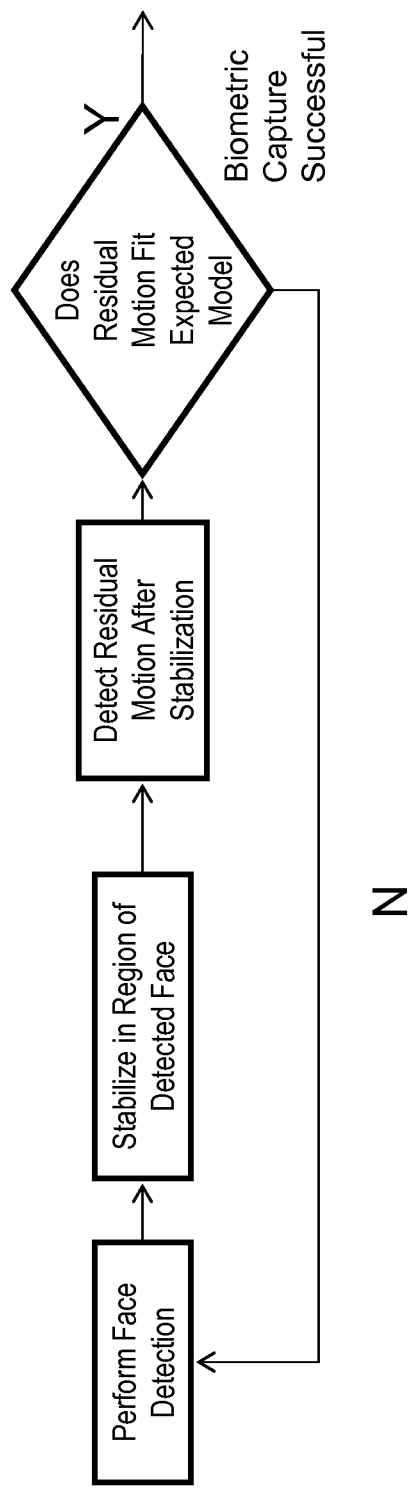
FIG. 10 depicts one embodiment of certain steps of a method for determining or ensuring a biometric chain of provenance.
Figure 12:
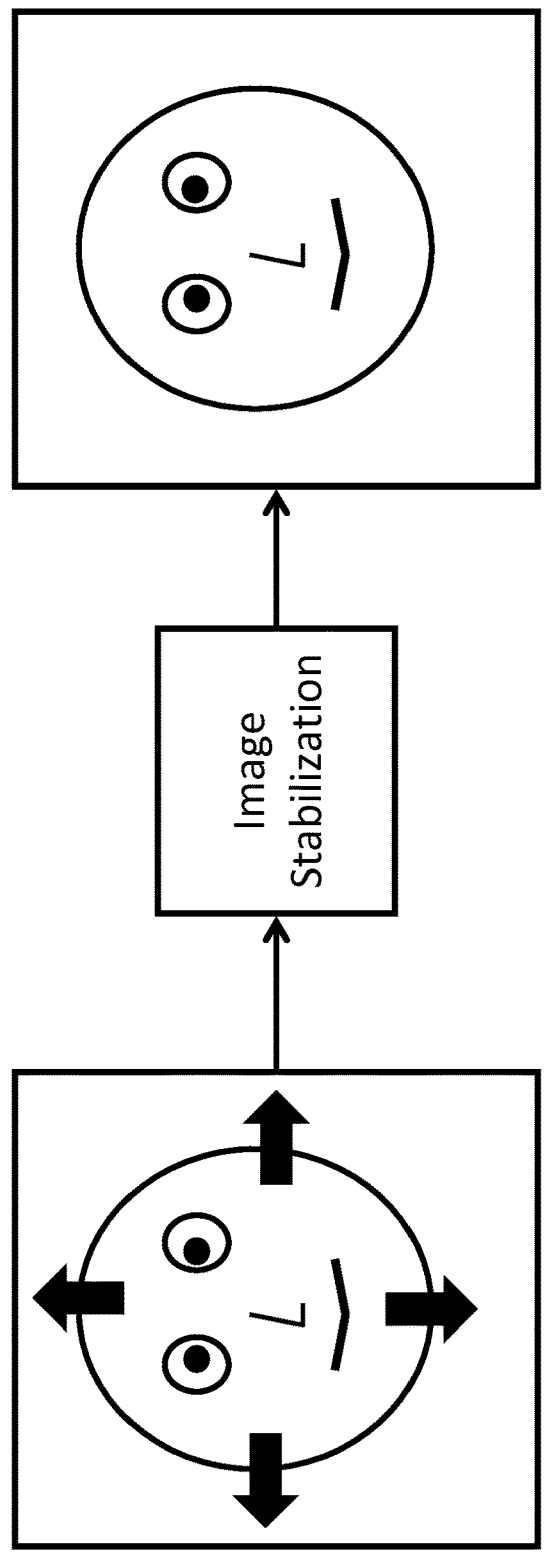
FIG. 12 depicts an embodiment of the present system incorporating image stabilization.
Figure 13:
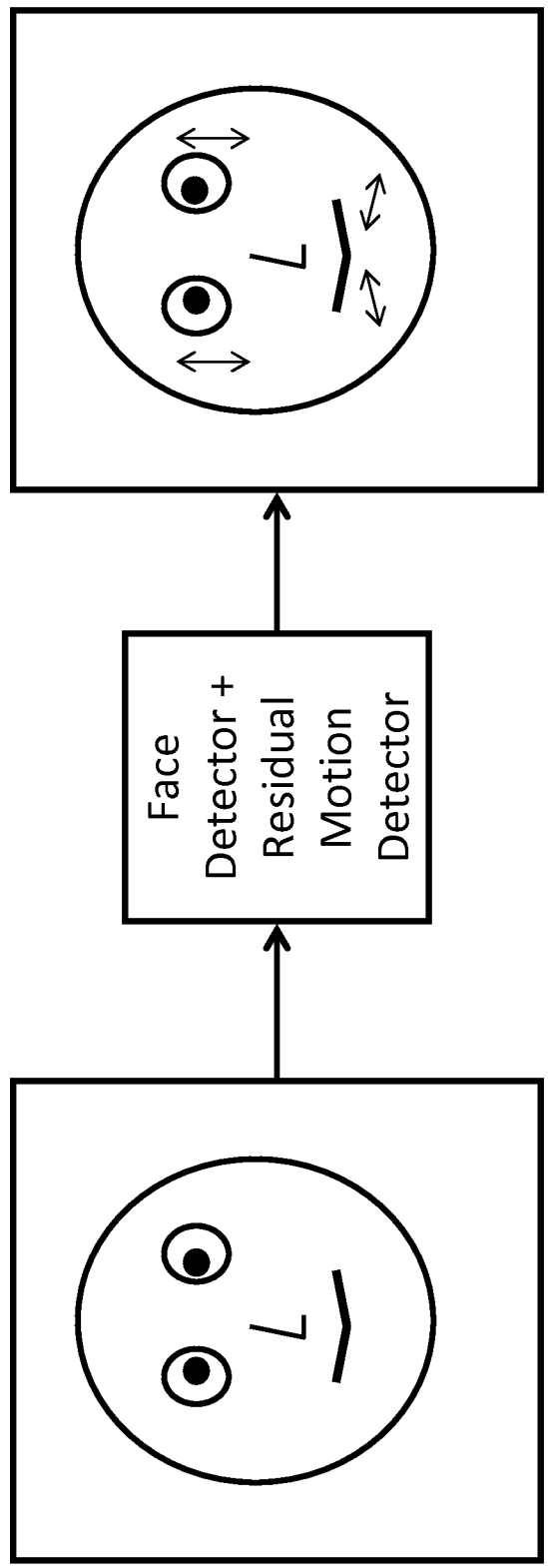
FIG. 13 depicts an embodiment of the present system incorporating residual motion detection.

FIG. 10 shows an example breakdown of the "Biometric Capture module" in FIG. 9. In this example, imagery may be acquired using a camera on the personal access control device and optionally an illuminator as shown in FIG. 11, and faces are detected. Methods for detecting faces are described, for example, in M. Turk, A. Pentland, Eigenfaces for Recognition, Journal of Cognitive Neurosicence, Vol. 3, No. 1, 1991, pp. 71-86. The face region may be stabilized as shown in FIG. 12 to remove motion due to instability of the user holding the camera. Methods for stabilization may be adapted from, for example, "Efficient Image Stabilization and Automatic Target Detection in Aerial FLIR Sequences", Enrique Estalayo et. Al, Proc SPIE 6234 (2006). Only the region of the face may be used for stabilization so that the user can still walk, for example, so that the background is moving. The residual motion of the user after stabilization may be detected as shown in FIG. 13. Methods for detecting residual motion are described, for example in "Efficient Image Stabilization and Automatic Target Detection in Aerial FLIR Sequences", Enrique Estalayo et. Al, Proc SPIE 6234 (2006). This residual motion field may be compared to an expected model of a live person. For example, it may be expected that the eye region of person should have motion with a time period due to eye blink for example. The mouth region may also be expected to have motion. If the measured residual motion fits the model, then the biometric capture may be deemed successful. If the measured residual motion does not fit the model, then the user may try the acquisition again. It may be desirable to include a unique device ID in the "biometric capture" step since this is additional evidence of who the user of the device may be.

Figure 14:
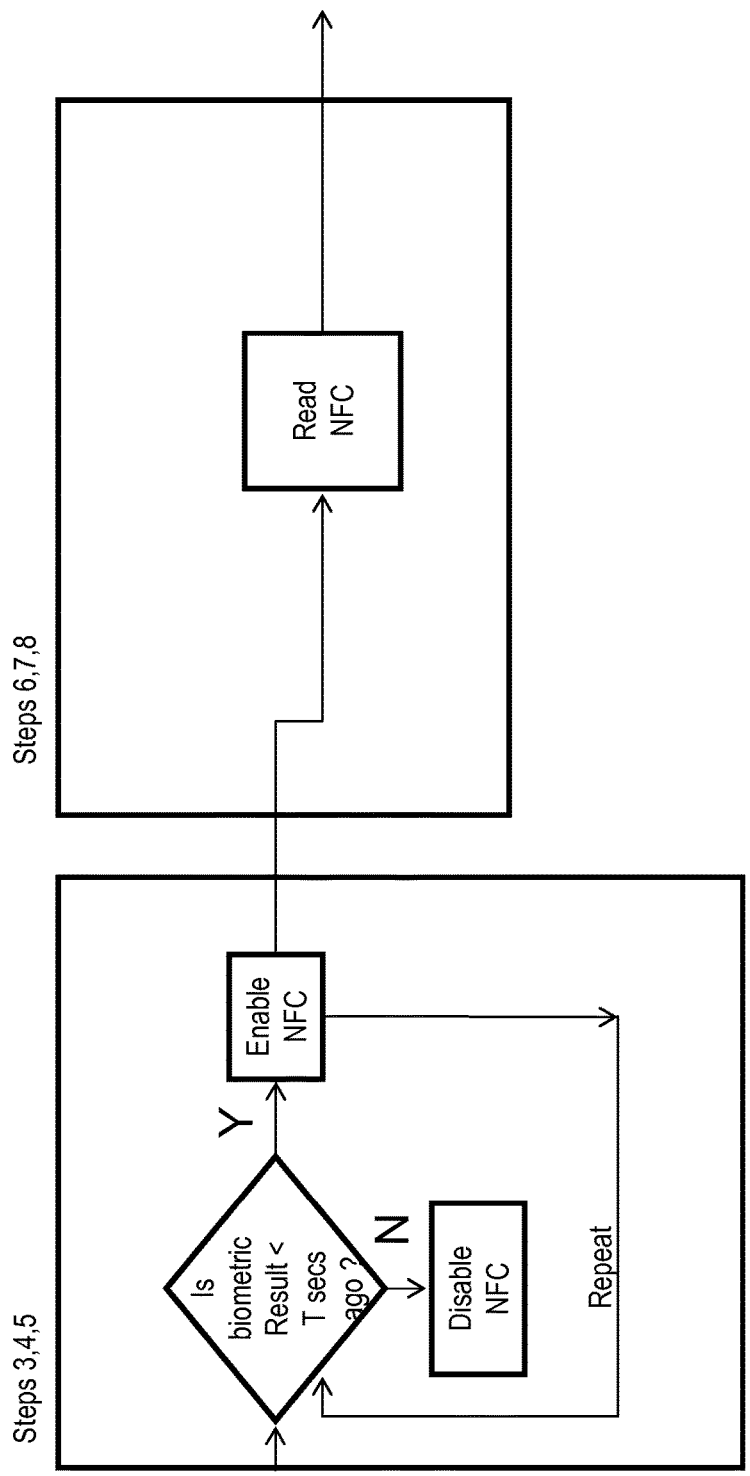
FIGS. 14-19 depicts some embodiments of certain steps of a method for determining or ensuring a biometric chain of provenance.

FIG. 14 shows a breakdown of an example of steps 3, 4, 5 (on the left) and steps 6, 7, 8 (on the right) and some of the modules described in FIG. 9. In this example the NFC (near-field-communication) module on the personal access control device and the transceiver module may be used. After the biometric capture or matching has been performed, the NFC communication may be enabled but only for a time interval. This means that a user cannot simply verify themselves 1 hour earlier, for example, and then use the personal access control device to gain access. This time interval may be as short as 60 or even 5 seconds, for example. This may also be a deterrent for someone to pass their device to an unauthorized user since the shorter the time period then the closer the user and the unauthorized user may be together at the turnstile. The NFC module may send out an RF (Radio Frequency) signal that may be received on the Transceiver module which then enables the rest of the process shown in FIG. 9 to occur.

Figure 15:
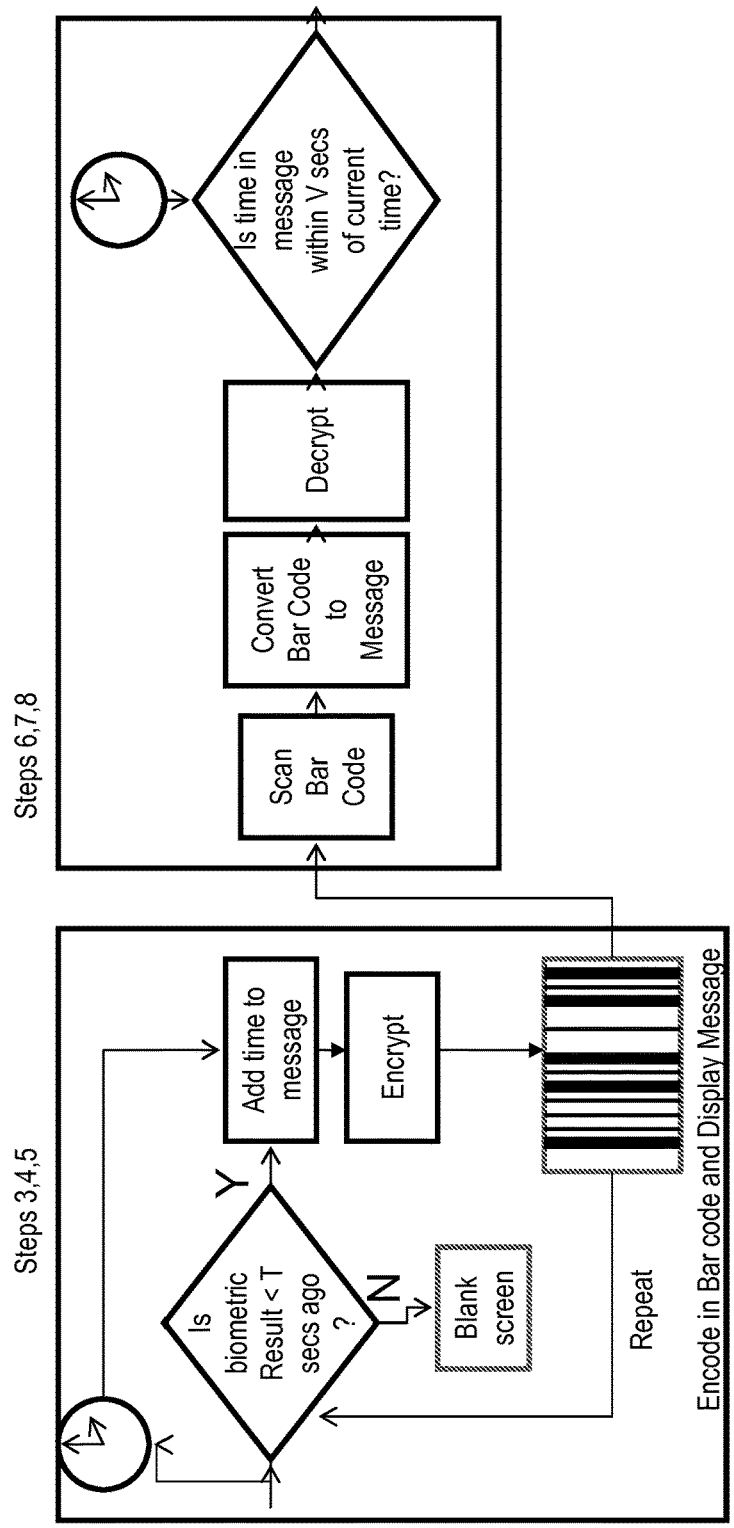
Figure 16:
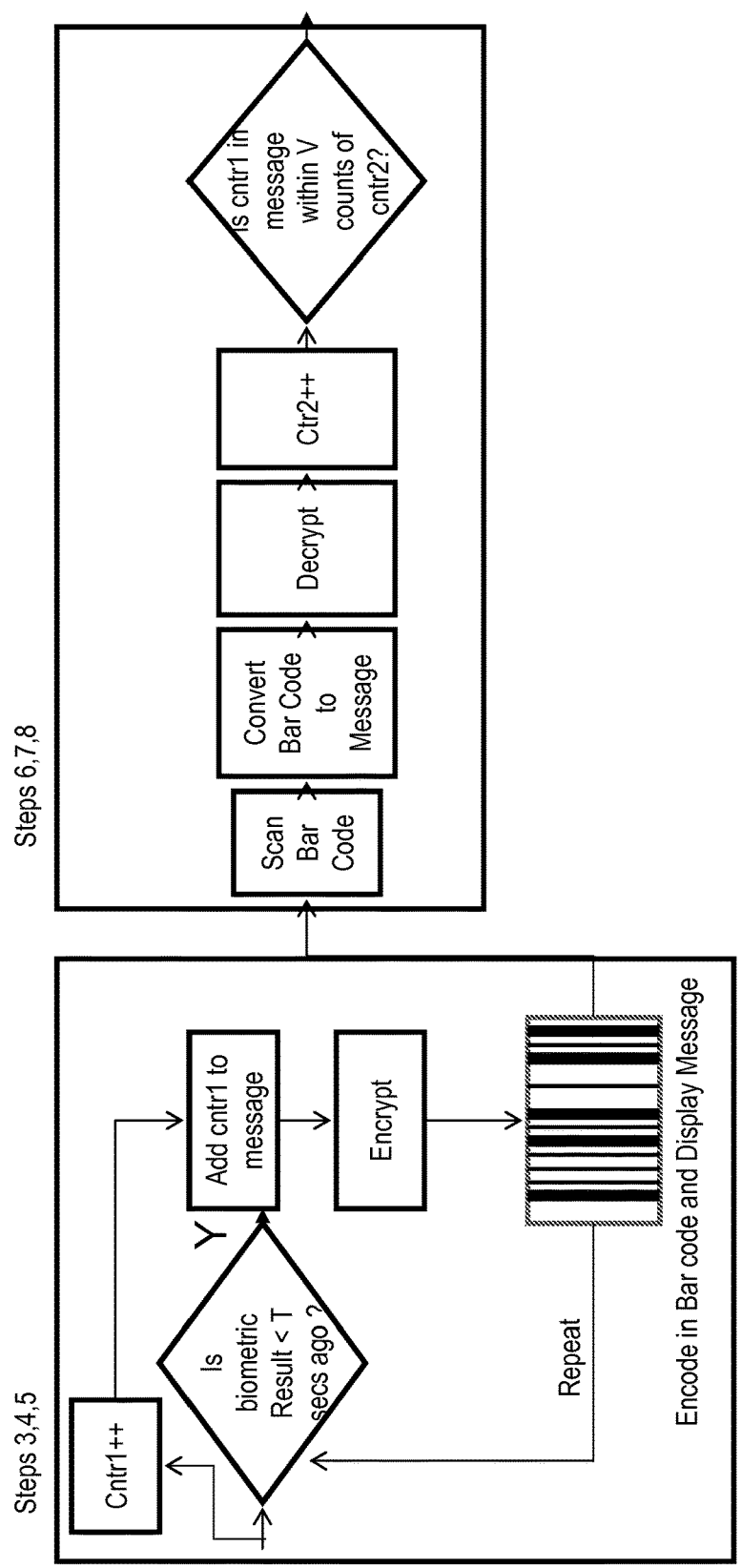

FIG. 10 shows another example where instead of NFC, a bar code (1D or 2D) may be displayed on the screen of the personal access control device. Just as in NFC, the bar code may be displayed for a time interval. In addition, the bar code may be encrypted with a variable code using standard public/private key encryption methods so that the bar code is different each time the system is used. This can prevent the screen from being copied and used for unauthorized access. In addition, the time of the biometric acquisition can optionally be encoded in the bar code. When the bar code is read in the "receive message" module, not only can the authenticity of the "access allowed" message be detected, but a second check can be performed on the time interval between the acquisition of the biometric data and the current time. In addition, although there are a limited number of characters that can be stored on the bar code, then a compressed and encrypted image of the biometric data captured or matched can also be encoded in the bar code so that if unauthorized access occurs then biometric data is collected in order to identify the individual involved. FIG. 16 shows a similar method to FIG. 15 except separate counters on the personal access control device and on the transceiver modules may be compared for consistency.

Another method is to enable the semi-directional infra-red light source in the personal access control device so that a modulated signal may be sent that encodes the encrypted signal, rather than the image bar code. The user may point the device towards the transceiver module, much like a remote control, and the signal may be received by the transceiver module if the user is sufficiently close to the transceiver, and is pointing at the particular desired transceiver module as oppose to an adjacent transceiver module.

Figure 17:
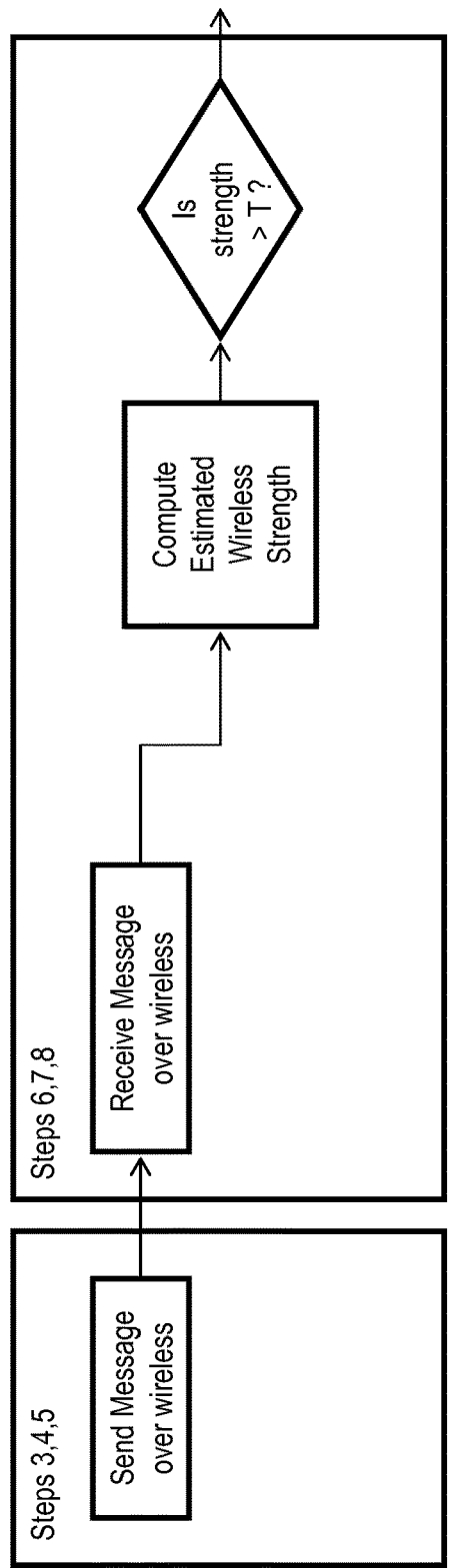

The steps above may require or assume that the user scans or points the personal access control device at the transceiver module which may usually be placed on or near the turnstile. While this may be acceptable in many cases, it can be desirable to remove this step so there are fewer actions for the user to perform. FIG. 17 shows an example of this. Again, steps 3, 4, 5 and steps 6, 7, 8 are broken down from FIG. 9. A message may be sent over wireless. However to prevent a person from authorizing at this distance away, the signal strength of the wireless signal can be monitored at the transceiver module and if above a threshold the personal access control device may be designated to be close to the transceiver module. This approach can be used in combination with the clock and counter methods described for the bar code method, embodiments of which are described in FIGS. 15 and 16. The roundtrip time-of-flight of the wireless signal (e.g., personal device to transceiver to personal device, or transceiver to personal device to transceiver) can also be used to measure the distance.

Figure 18:
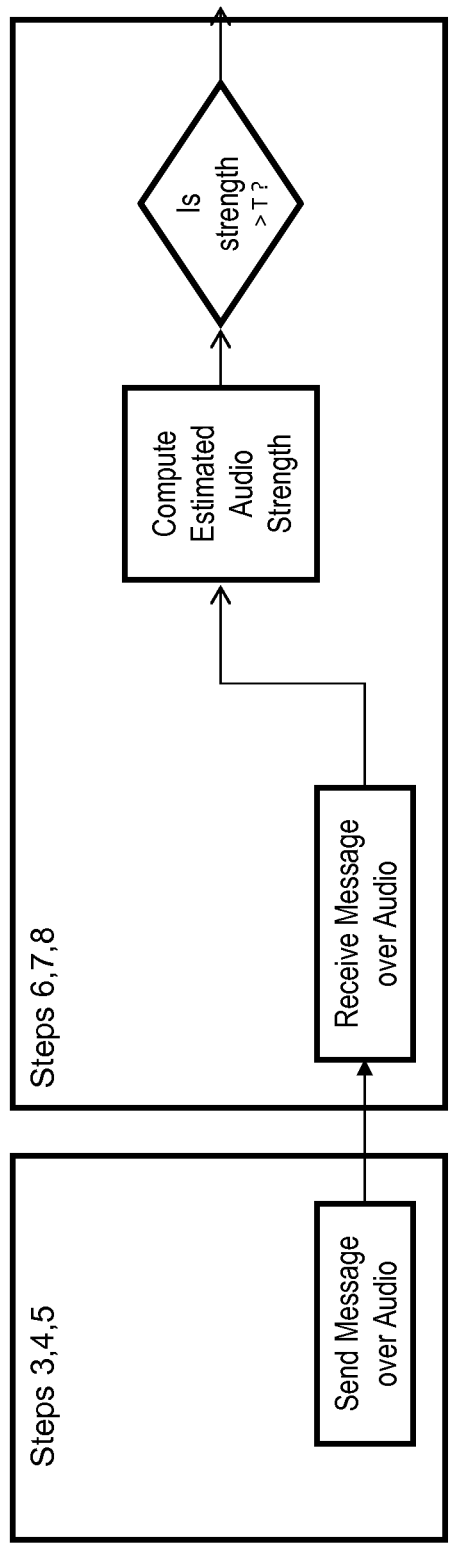

Another embodiment of the method is shown in FIG. 18. In this case, an ultrasonic audio signal may be used rather than a wireless signal. This can allows standard hardware in a cell phone to be used for communication.

Figure 19:
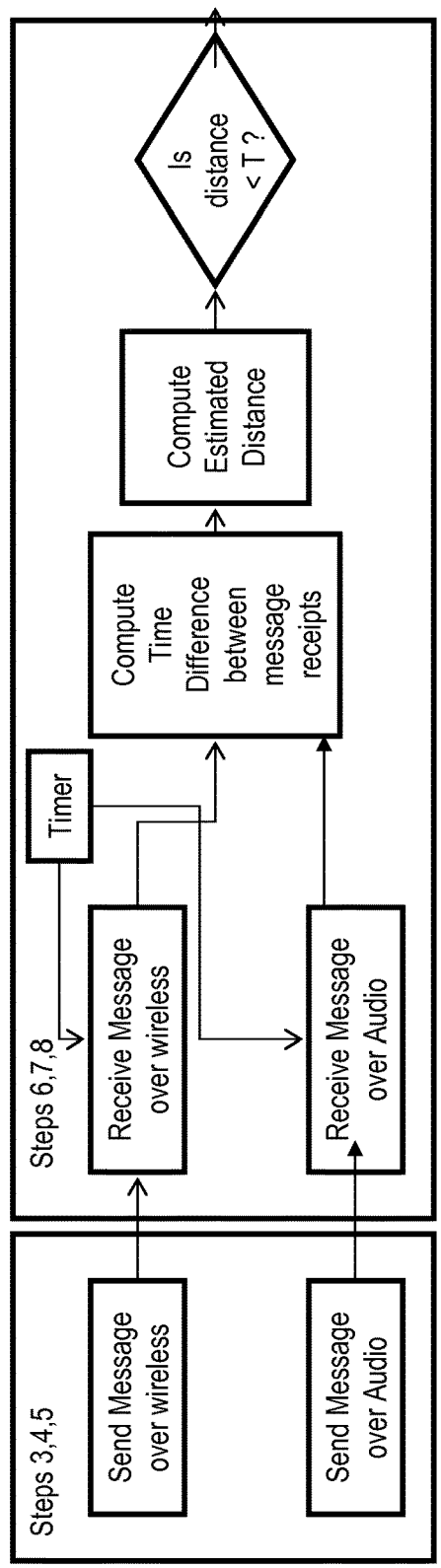

FIG. 19 shows another embodiment of the method that uses both wireless and audio. Messages may be sent simultaneously over wireless and audio. The time difference between the receipt of the wireless signal and the audio signal can be measured. With the speed of sound being 330 m/sec, and a temporal accuracy of only 1 usec, for example, the distance measurement from the personal access control device to the transceiver module can be determined to be 0.33 mm.

Figure 20:
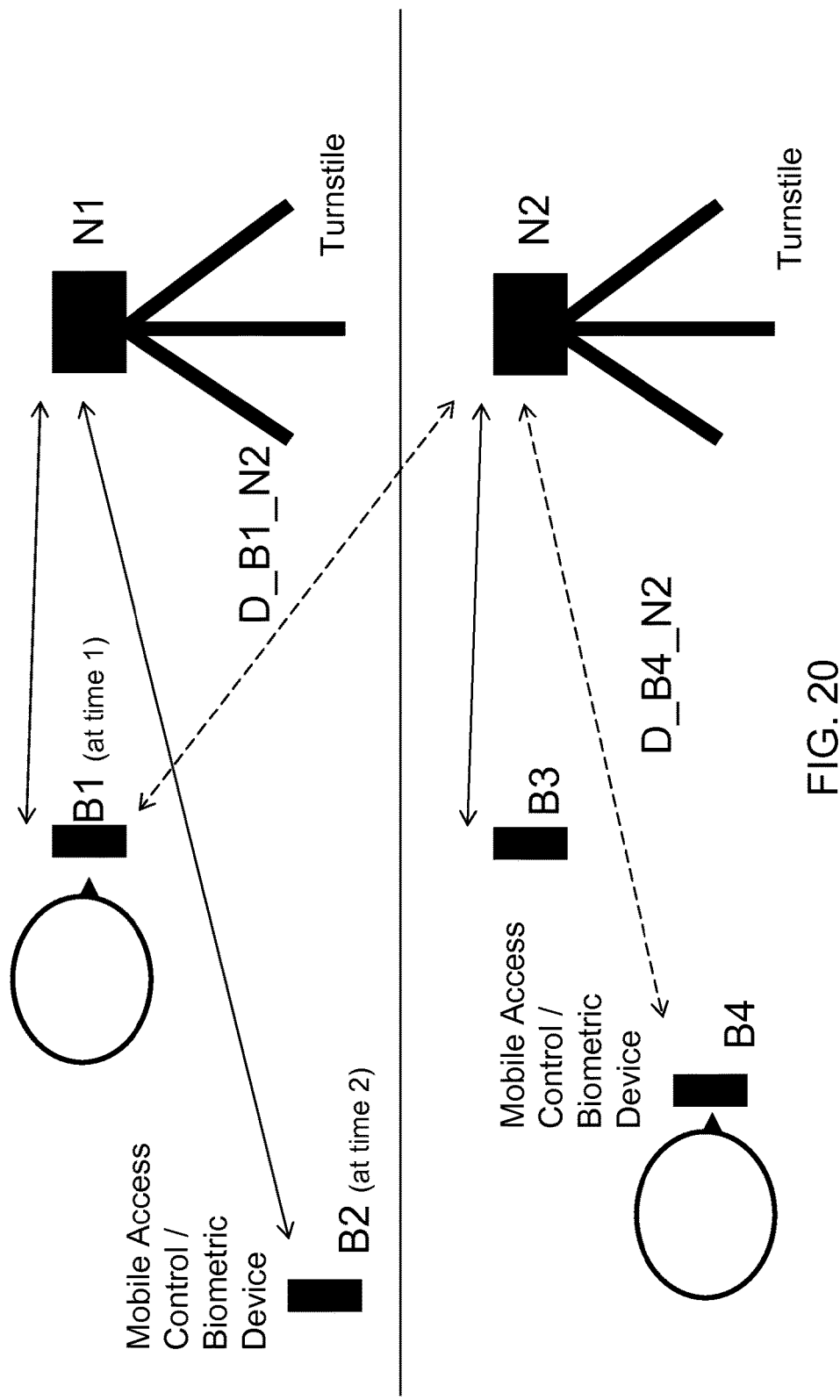
FIG. 20 depicts one embodiment of the present system configured for multiple users.

FIG. 20 shows a potential issue with these methods that allow remote access to a particular turnstile or access point, that are adjacent to each other; when at a distance, a particular transceiver node may not be able to tell whether the signal is coming from its lane or an adjacent lane. FIG. 20 shows for example that personal access control device B1 is in fact closer to the turnstile in the adjacent lane compared to personal access control device B2 which actually is in the adjacent lane. A user in one lane could therefore potentially open up the wrong turnstile. This problem may be mitigated if the thresholds in the approaches above are made small enough so that effectively the ambiguity cannot occur. This may mean that the users have to hold the devices fairly close to the relevant transceiver module.

Figure 21:
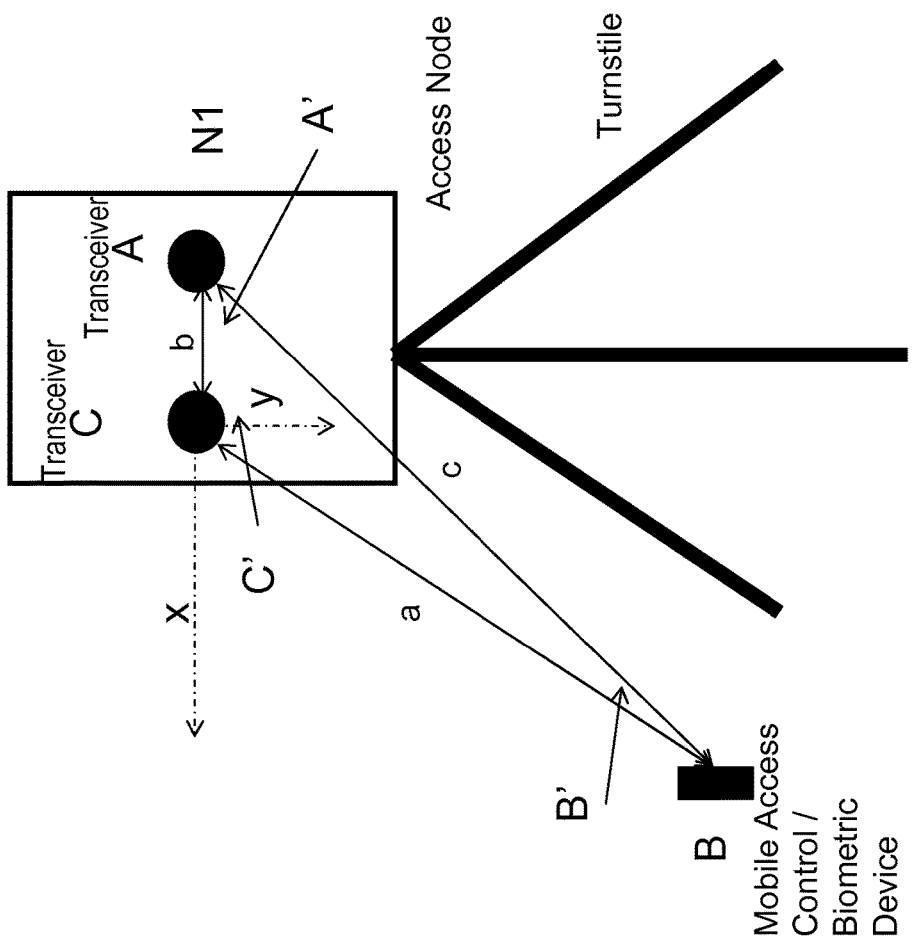
FIGS. 21 and 22 depict embodiments of access nodes with multiple transceiver modules.

FIG. 21 shows one solution to this problem. In this case, there are two transceiver modules, each receiving signals and computing distance measurements as described earlier. Since there are two transceiver modules, two distances can be calculated and the position of the personal access control device triangulated from that, using the known geometry of the transceiver nodes. For example, the geometry relating the measured distances to the angles shown in FIG. 21 may be given by: $\cos(A')=(b^2+c^2-a^2)/(2bc)$, $\cos(B')=(a^2+c^2-b^2)/(2ac)$, $\cos(C')=(a^2+b^2-c^2)/(2ab)$. The (x,y) coordinate of the personal access control device B with respect to transceiver node C may be given by $x=a \cos(180-C')$, and $y=a \sin(180-C')$.

Figure 22:
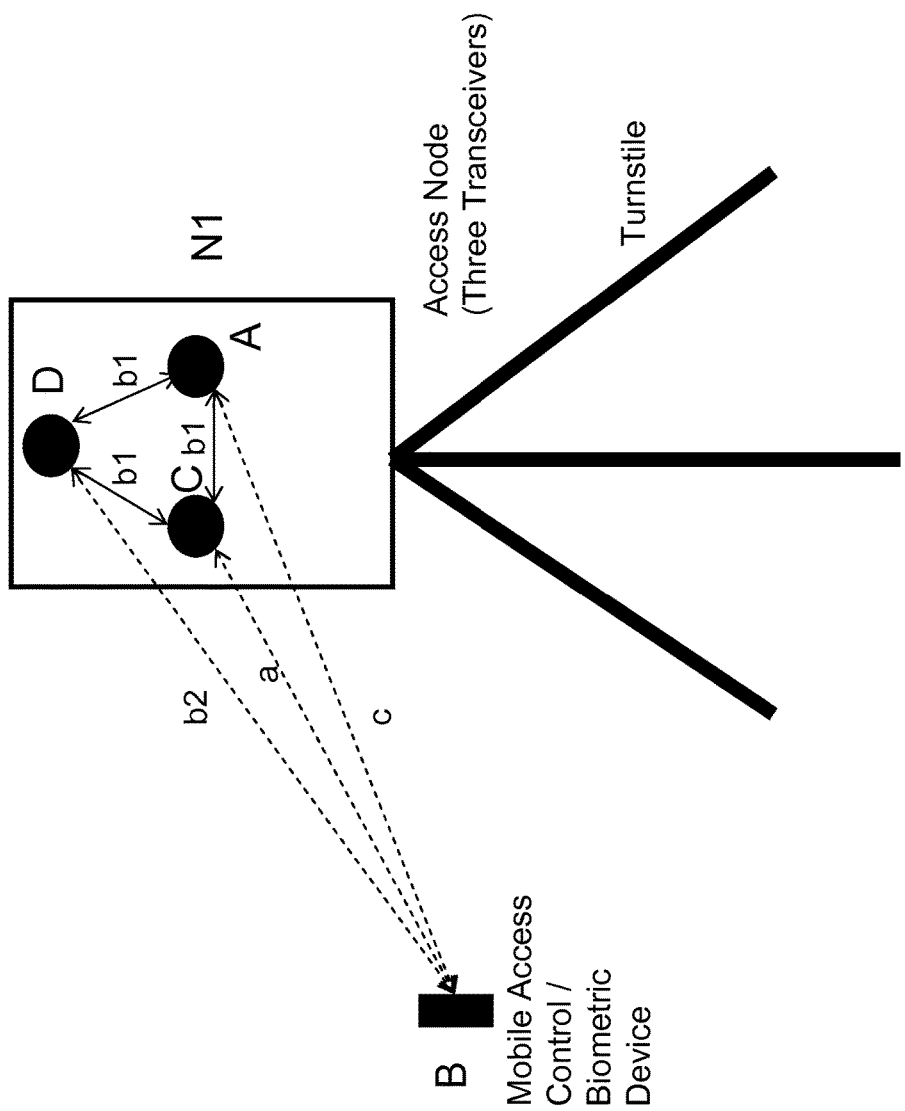

FIG. 22 shows another configuration with three transceiver nodes arranged in a triangle. As will be shown later, such arrangements can provide more accurate and stable estimates of position.

Figure 23:
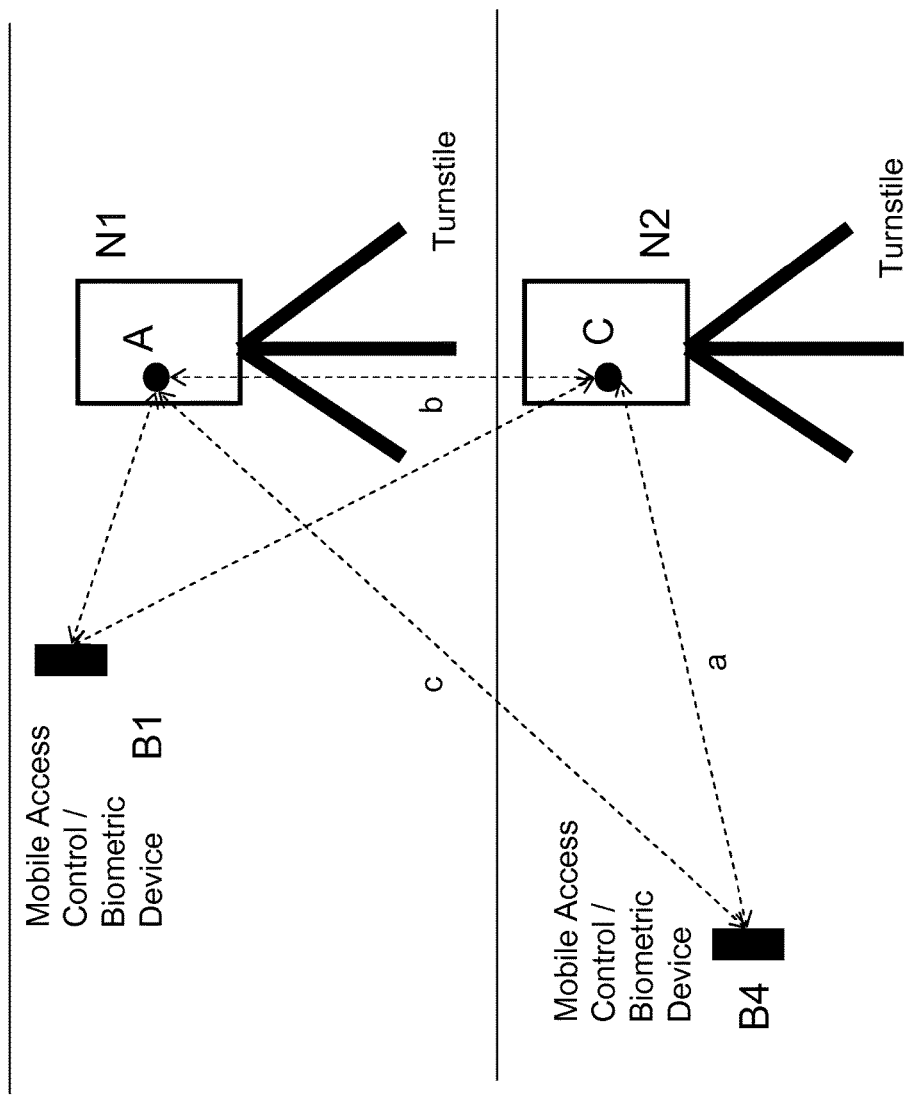
FIG. 23 depicts another embodiment of the present system involving multiple users.

FIG. 23 shows another configuration where the personal access control device communicates with transceiver nodes in the adjacent lane (or elsewhere) in order to increase the separation between transceiver nodes and increase the accuracy and stability of the position estimate as shown below. The distance estimates can be transferred from one transceiver node to the next over a standard network connection.

Figure 24:
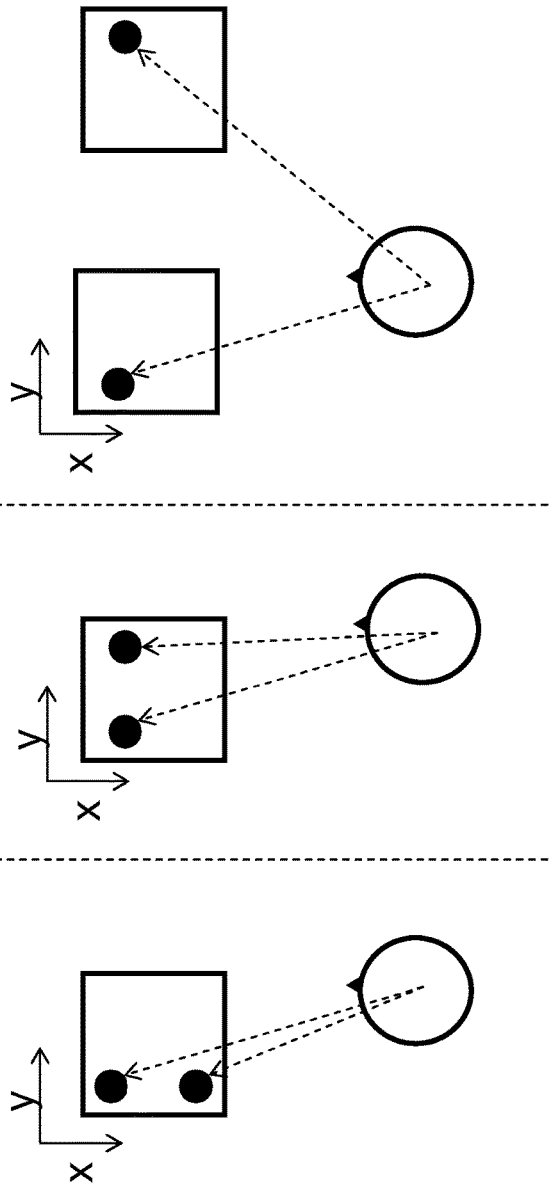
FIG. 24 depicts another embodiment of a system for acquisition of face imagery and iris imagery using a single sensor.

FIG. 24 shows embodiments of the three configurations in FIG. 21, 22, 23. The table shows the result of computing the distance with all four combinations of +−0.33 mm accuracy, which corresponds to 1 usec temporal measurement error. The transceiver nodes in the left and middle are 0.1 m apart, and on the right the nodes are 1 m apart, and the user is at a point (4, 0.5) m from the first (or left depending on the configuration) transceiver node. The table on the left shows that with the transceiver modules arranged along the length of the lane as shown, the estimated X coordinate (along the lane direction) may vary very little but the estimated Y position may vary by almost up to ½m. This is the direction in which we may desire accuracy, since it differentiates one lane from the other. The middle table shows the same table when the transceiver nodes are mounted orthogonal to the axis of the lane. Note that the estimated Y position may vary by only 0.06 m. This is because the positioning of the transceiver modules in this orthogonal configuration may provide more accuracy in the Y direction. The triangular configuration in FIG. 22 can give more accuracy approximately isotropically around the transceiver module cluster. FIG. 24 on the right shows the estimated Y position when transceiver nodes are used between adjacent lanes. Note that the estimated Y position may vary only by 0.006 m. This is because of the much wider baseline of the transceiver modules resulting in more accurate position estimates.

Figure 25:
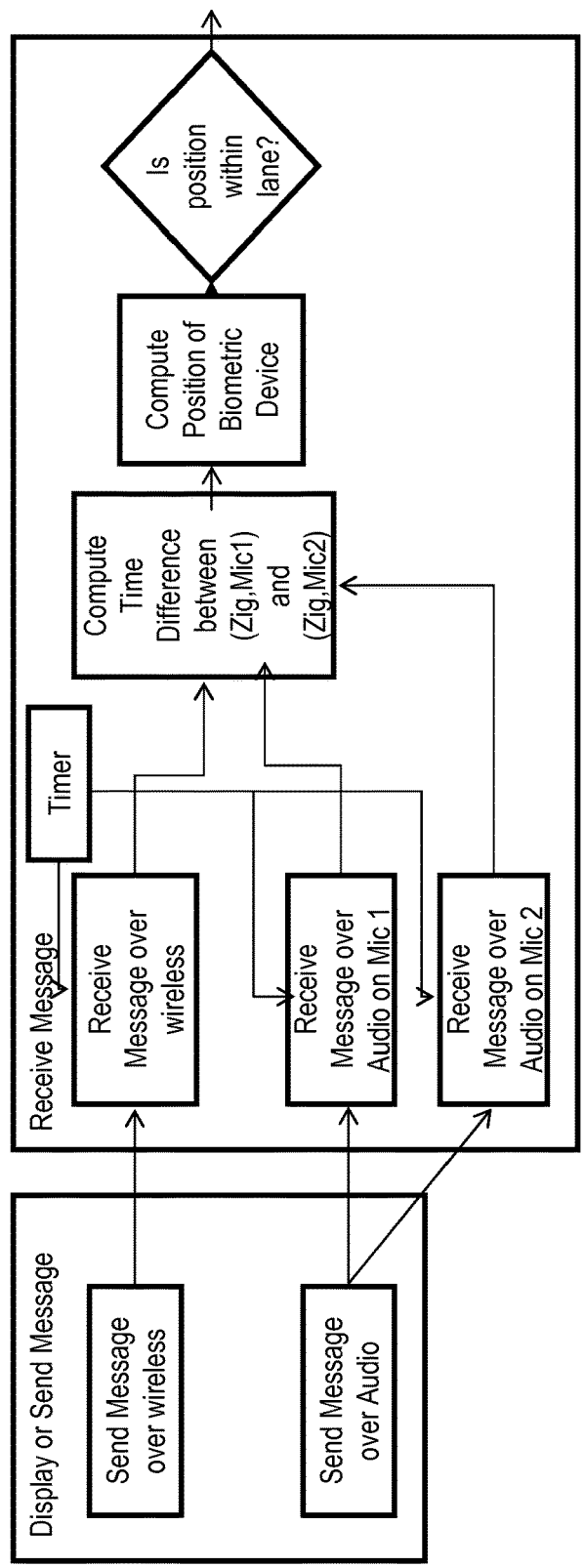
FIGS. 25-27 depict certain embodiments of certain steps of a method for determining or ensuring a biometric chain of provenance.
Figure 26:
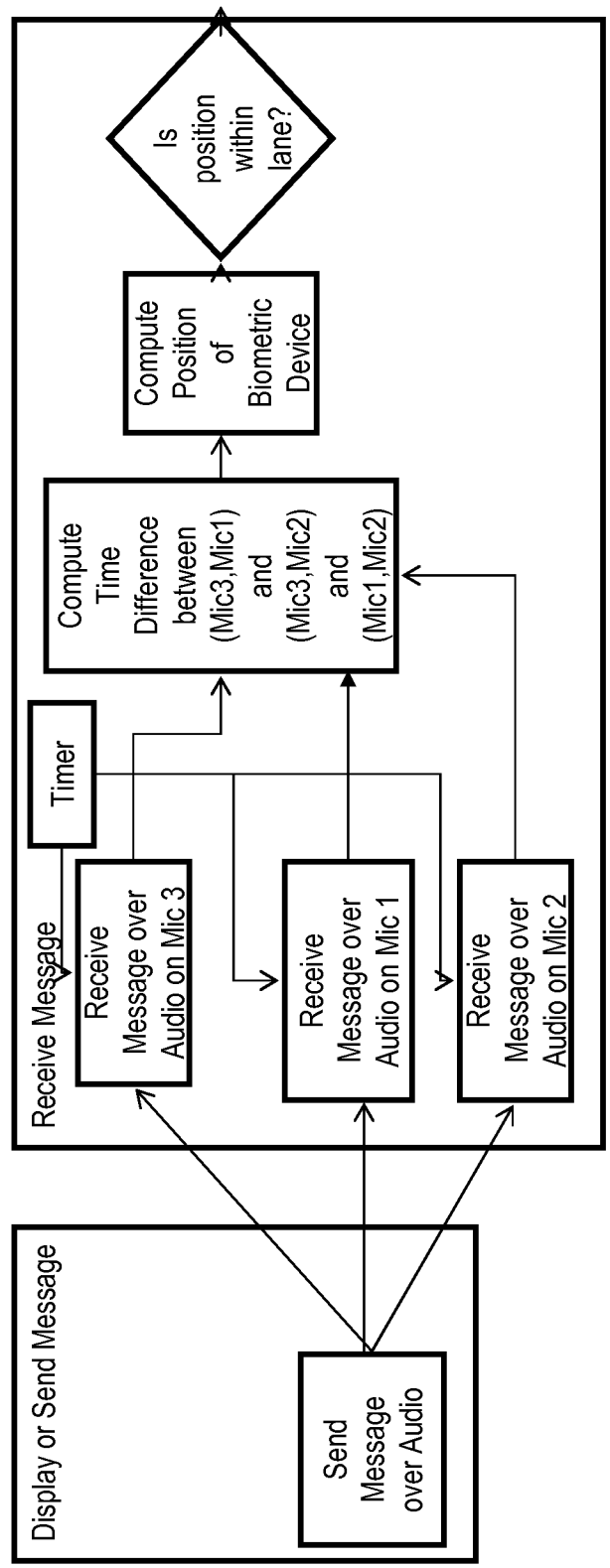

FIG. 25 shows how this method is implemented using two transceiver modules using both wireless and audio signals. FIG. 26 shows how the method can be used just using three transceiver modules and three audio signals.

Figure 27:
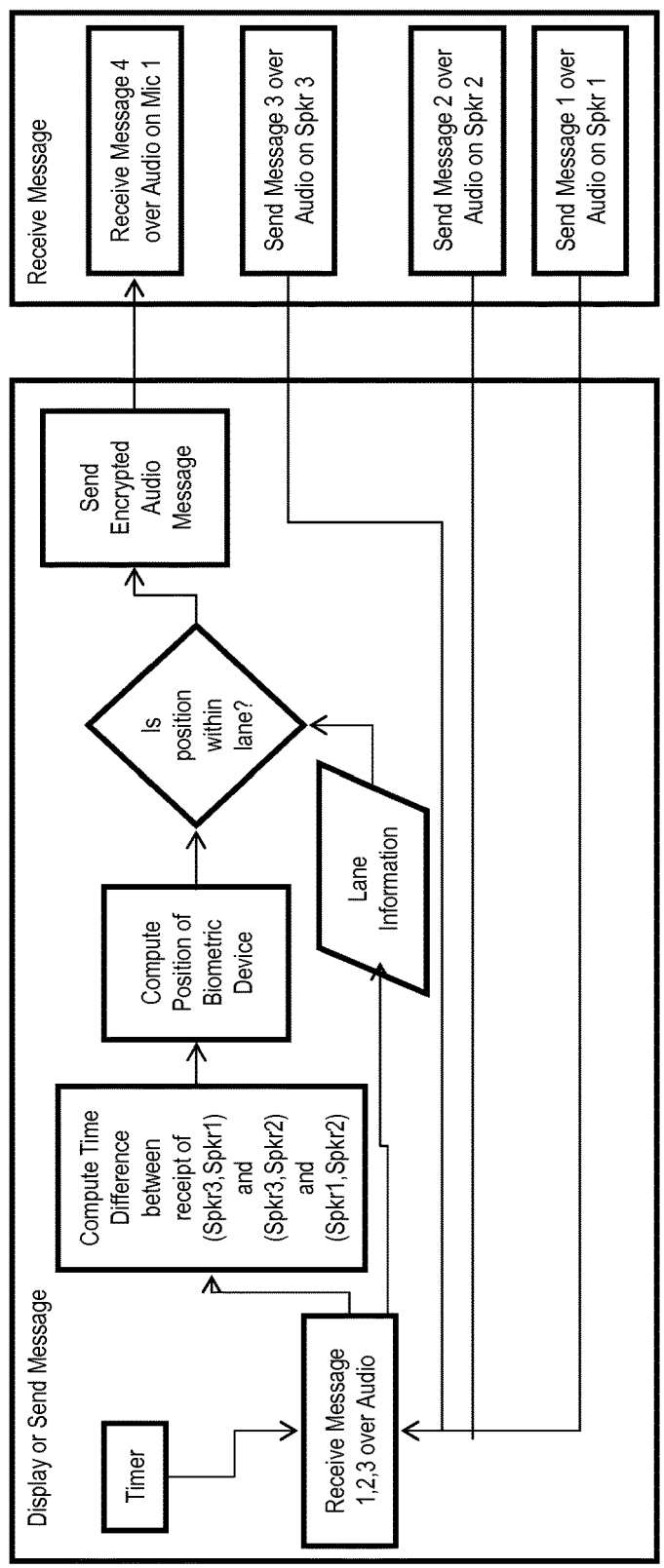

FIG. 27 shows how in all of these approaches above, the transceiver modules can be used as the transmitting devices rather than just the receiver devices. While FIG. 27 shows how audio signals are used exclusively, then the approaches described above can be interchanged. For example, audio signals can be sent from the transceiver modules and a bar code can be displayed on the personal access control device and used as a means to communicate back to the transceiver module.

Also note that the transceiver nodes need not necessarily be positioned at the location of the access node where physical or logical access occurs. If the position of the personal access control device is known with respect to the transceiver nodes, and since the geometry of the transceiver nodes is known a priori with respect to the access nodes, then the position of the personal access control device to the access nodes can be computed by geometry.

Note also that another method for establishing when the personal access control device is within the vicinity of an access node that the user holding the personal access control device is the same person who successfully used the biometric capture or match module, is to detect whether the user has parted with the device between the time of biometric capture and detection of the device at the point of access. This would occur if the user passed the device to another user, for example. For example, one approach is to have a button on the device that must be held during and after authentication before a message is sent from the personal access control device to the transceiver module, to ensure that the device is not passed from one person to the next. Note also that the biometric capture or matching modules can be omitted in some instantiations of the disclosure and replaced with the device ID.

In another but similar embodiment, a user is in the vicinity of a turnstile or point-of-sale location, holding a personal access control device such as a mobile phone. On the turnstile or point-of-sale location is an access node, which may be a second mobile phone. With reference to FIG. 28, four distinct positions and time elements as disclosed are shown. Biometric data "Bio_XYZT" may be acquired and collected onto the mobile device at geometric position and time "Mobile_XYZT_1". The user may move the device to a new geometric position and time "Mobile_XYZT_2" at which the proximity between the mobile device and the access node "Node_XYZT" may be measured either explicitly using the distance-measurement methods described previously, for example an audio ranging method, or implicitly for example using a camera on the access node that captures imagery of a bar code on a screen on the mobile phone, which can be done successfully if the mobile phone is within a certain zoom range of the access node. These are elements in the Biometric Chain of Provenance described herein. The disclosure provides a means to ensure that the chain of biometric provenance is not broken. As discussed earlier, we define the meaning of breaking the chain of biometric provenance. The four discrete position and time elements are Bio_XYZT, Mobile_XYZT_1, Mobile_XYZT_2 and Node_XYZT. We may want to ensure that the particular user with the biometric characteristics Bio_XYZT can be immediately associated to Node_XYZT at the identical values of space and time XYZT, so that the biometric may be unambiguously associated to the node. However it may be impractical to acquire the biometric at exactly the same place and time as the association is made to the node, since the mobile phone typically needs to be used in one particular way to acquire the biometric, and then in a second particular way to communicate with the node. Given therefore that the biometric acquisition and communication to the node are done at potentially different values of position and time of the XYZT of the mobile device, there is potential for fraudulent or ambiguous operation to occur. For example, an application may be a point of sale transaction where a check-out attendant is present. Two roles of the checkout attendant may be i) to be present and observe the user presenting the biometric to the mobile device, and ii) be present and observe the user presenting the mobile device to the node. However, it may not be preferable for the user to acquire the biometric well away from the point of sale area since no observation of the process can be performed by the checkout attendant. Similarly it may be quite possible (depending on the distance-measurement methods used) to present the mobile device far from the access node which again may be out of sight of the checkout attendant or guard. The disclosure can allow such situations to be avoided, and parameters as disclosed herein can allow different types of use cases to be realized depending on the particular requirements. For example, in some cases such as in a hotel check-in application, it may not even be necessary for an operator to observe the user using the device. These parameter adjustments are discussed further below.

The four discrete position and time elements are Bio_XYZT, Mobile_XYZT_1, Mobile_XYZT_2 and Node_XYZT. In some embodiments, the more critical metrics for ensuring the chain of biometric provenance may include the spatial and time difference between Mobile_XYZT_1 and Mobile_XYZT_2, and between Mobile_XYZT_2 and Node_XYZT. This is because there may be an implicit chain of provenance between Bio_XYZT and Mobile_XYZT_1 since the mobile device typically acquires the biometric data Bio_XYZT almost at the identical time, and implicitly acquires the data within a close proximity governed by the maximum hand-face distance of the user of approximately 24", and also by the characteristics of the sensors on the mobile device which typically acquire biometric data when the user is near the mobile device. However additional methods of constraining the user-to-device distance can be enforced. For example, a face detector algorithm can be performed on the mobile device, and the spacing between the eyes of a detected face may be calibrated to the average human eye-spacing or particular eye spacing of the user can be used to determine that the user is in fact only a particular distance away from the device.

Both the spatial difference and the time difference between Mobile_XYZT_1 and Mobile_XYZT_2 in particular is considered. For example, the time difference between Mobile_XYZT_1 and Mobile_XYZT_2 can be significant since if the maximum speed of a potential user may be 0.25 m/sec for example, then a time-difference threshold of T_diff=3 seconds means that the user could have moved 3×0.25=0.75 m in that time period which may be below a threshold that determines that the chain of biometric provenance is valid. In this case this means that the checkout attendant may be able to see the user since they are only 0.75 m away. But in an alternate embodiment, the spatial difference between Mobile_XYZT_1 and Mobile_XYZT_2 can be measured instead by integrating accelerometer information on the mobile device. This distance may be measured to be 0.75 m, but the user may take 20 seconds, for example, until they present the mobile device to the access node. Since the measured spatial difference is still within the acceptable range at 0.75 m, then such a long time interval may be allowable by the chain of provenance rule set depending on the use case.

In certain embodiments, the temporal difference between Mobile_XYZT_2 and Node_XYZT may be typically small since the data is transferred in a short time instant. The difference in distance may be explicitly measured and checked to be below a threshold, for example 0.75 m, or the distance may be implicitly verified to be below a threshold due to the inability of the particular communication method to communicate information further than a particular distance.

Each of FIGS. 29-33 on the top gives different examples of the spatial and temporal values of each of Bio_XYZT, Mobile_XYZT_1, Mobile_XYZT_2 and Node_XYZT, and shows how a chain of biometric provenance can be confirmed or denied using combinations of spatial and temporal constraints with the different sets of rules shown for each figure at the bottom.

In FIG. 29, the user acquires their biometric and may present his/her device within a sufficiently short time period (T_c−T_b) such that provenance may be confirmed. In FIG. 30 however, the rules may be configured such that (T_c−T_b) is measured to be too long and provenance may be denied. FIG. 31 shows a case where the user may acquire his/her biometric and may present his/her device such that the device has not moved more than distance D2 between the time of biometric acquisition and presentation of the device to the node, and such that the distance of the device from the node at the time of presentation of the device to the node is less than distance D3, and provenance may therefore be confirmed. FIG. 32 shows a similar situation to case 4, except the mobile device may be presented at a distance greater than D3 from the node, and therefore provenance may be denied. FIG. 33 shows a case where both distance and temporal rules may be applied simultaneously. In this case the rules may be configured so that even though the device was within all distance thresholds throughout, the user may have taken too long (>=T2 seconds) to present the device to the node after the biometric was recorded and provenance was denied.

Figure 34:
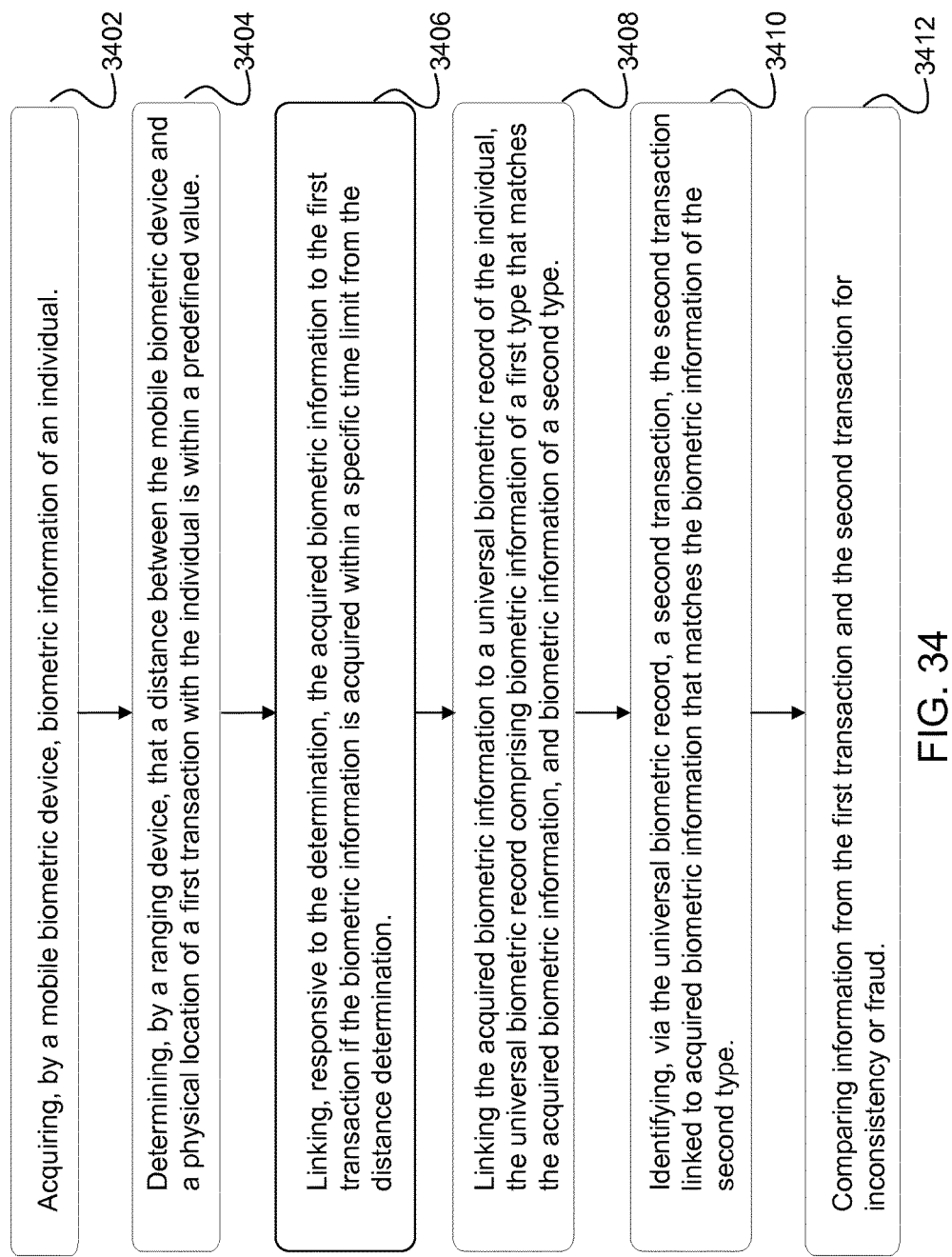
FIG. 34 depicts one embodiment of a method for ensuring integrity of biometric data linked to one or more transactions.

Referring now to FIG. 34, one embodiment of a method for ensuring integrity of biometric data for one or more transactions is depicted. In brief overview, the method includes acquiring, by a mobile biometric device, biometric information of an individual (3402). A ranging module of a transaction device may determine that a distance between the mobile biometric device and a physical location of a first transaction with the individual is within a predefined value (3404). The transaction device may link, responsive to the determination, the acquired biometric information to the first transaction if the biometric information is acquired within a specific time limit from the distance determination (3406). The transaction device may link the acquired biometric information to a universal biometric record of the individual (3408). The universal biometric record may include biometric information of a first type that matches the acquired biometric information, and biometric information of a second type. A biometric integrity engine may identify, via the universal biometric record, a second transaction (3410). The second transaction may be linked to acquired biometric information that matches the biometric information of the second type. The biometric integrity engine may compare information from the first transaction and the second transaction for inconsistency or fraud (3412).

Referring now to (3402), in more detail, a mobile biometric device may acquire biometric information of an individual. In some embodiments, a biometric device, mobile or otherwise, may acquire biometric information of an individual. The biometric device may acquire, capture, record or otherwise process one or more sets of biometric information from the individual. In certain embodiments, the individual may carry and/or operate the biometric device. The mobile biometric device may be a personal or portable device of the individual, and/or assigned to the individual for use (e.g., for biometric acquisition and/or verification). The biometric device may acquire biometric information while the individual is moving, stationary, or substantially still. In some embodiments, the biometric device may acquire biometric information when the individual is approaching and/or near to a physical location, such as an access point, a point-of-sale terminal, or a secured area or device. The individual may initiate biometric acquisition when the individual is approaching and/or near to the physical location. For example, the individual may raise the device close to the individual's face or eye, to acquire biometric data, including but not limited to iris, voice and/or facial data.

In some embodiments, the biometric information is stored or processed further if a distance or separation between the individual (e.g., the individual's head, face, eye or iris) and the biometric device during biometric acquisition is within a certain threshold value or range. For example, the biometric device may include a ranging module to measure its distance from the individual, or the biometric device may include software to check that the size, quality and/or orientation of the biometrics acquired are acceptable or optimal.

Referring now to (3404), in more detail, a ranging module of a transaction device may determine that a distance between the mobile biometric device and a physical location of a first transaction with the individual is within a predefined value. In some embodiments, a ranging device or module determines the distance between the mobile biometric device and a physical location of a first transaction with the individual. The ranging device or module may be part of the biometric device, or part of a transaction device located at or connected to the physical location. In some embodiments, the ranging device or module may be connected (e.g., wirelessly or via a network) to the biometric device and/or the transaction device. The ranging device or module may collect location information of the biometric device and/or the transaction device from the biometric device and/or the transaction device. In some embodiments, the ranging device or module may determine the distance before a transaction occurs at the physical location. The ranging device or module may determine the distance during or after a transaction with the individual at the physical location has been initiated or completed. The ranging device or module may determine the distance before, during, and/or after the biometric acquisition. The ranging device or module may determine the distance while the biometric device and/or the individual is stationary or in motion.

In some embodiments, the distance or location determination is triggered or initiated by the biometric acquisition. In other embodiments, the biometric acquisition is triggered or initiated by the location determination. The distance or location determination is triggered or initiated responsive to the (e.g., successful) acquisition of biometric data from the individual. In certain embodiments, the distance or location determination and the biometric acquisition are triggered or initiated at substantially the same time, and/or by the same event. For example, the individual may push a button on the biometric device to start the distance or location determination and/or the biometric acquisition. By way of illustration, a sensor of the biometric device may alert the user to commence biometric acquisition and/or location determination, for example when the biometric device is close to the physical location (e.g., access point). The biometric device may communication with the ranging device to perform the distance determination, for example, at around the same time as the biometric acquisition. A transaction device at the physical location may communicate with or instruct the biometric device and/or ranging device to start the distance/location determination and/or the biometric acquisition, e.g., when the individual is proximate to the physical location.

The distance determination may include a comparison of the distance between the biometric device and the physical location, and a predefined distance value or threshold. The transaction device, ranging device and/or the biometric device may accept (e.g., receive, store and/or process) the acquired biometric data if the distance is at and/or within the predefined value. New, replacement or additional biometric data may be acquired if the distance is at and/or beyond the predefined value. The ranging module or device may employ any one or a combination of techniques discussed earlier to locate the position of the biometric device, and/or the biometric device's separation from the physical location. For example, the ranging module or device may determine the distance between the mobile biometric device and the physical location via a global positioning system. The ranging module or device may determine the distance between the mobile biometric device and the physical location using a short-range location system. For example, the short-range location system may use one or more of a: radio-frequency, laser, infra-red and audio ranging process as discussed earlier.

In certain embodiments, the ranging module or device estimates or determines the distance between the mobile biometric device and a physical location based on strength of a signal received at one of: the physical location and the mobile biometric device, and transmitted by the other. The ranging module or device may use signal strength as a threshold determination of whether to store or further process the acquired biometrics, or to acquire new, replacement or additional biometric data. The ranging module or device may use or specify a particular signal strength to represent or indicate the predefined distance value or threshold. For example, if the mobile biometric device or the transaction device receives a signal of strength greater than S, the separation between the biometric device and the physical location is determined to be within the predefined distance value.

Referring now to (3406), in more detail, the transaction device may link, responsive to the determination, the acquired biometric information to the first transaction if the biometric information is acquired within a specific time limit from the distance determination. The transaction device may link the acquired biometric information to the location of the biometric device or the physical location if the biometric information is acquired within a specific time or time limit from the distance determination. The time of the biometric acquisition may be determined as the time the biometric acquisition is initiated/commenced, or the time the biometric acquisition is completed. The time of the distance determination may be determined as the time the distance determination is initiated/commenced, or the time the distance determination is completed. The transaction device may link or apply the identity of the individual, once established, to the transaction, the location of the biometric device and/or the physical location if the biometric information is acquired within a specific time limit from the distance determination. The specific time limit may be defined as a limit within which the biometric acquisition, the transaction and/or the distance measurement is considered contemporaneous or occurring substantially at the same time. The specific time limit may be defined as a limit within which there is a high certainty that integrity of the acquired biometric data can be maintained, presumed or is assured, e.g., the acquired biometric data is correctly attributed to the individual/transaction and/or is not fraudulent introduced. In some embodiments, there is a potential that biometric data may be fraudulently introduced for a transaction if the specific time limit is exceeded. For example, a person may obtain the biometric device to initiate/complete a transaction after biometric data has already been acquired from another person.

In some embodiments, the transaction device and/or the biometric device may compute, calculate, determine or otherwise define the specific time limit based on an amount or rate of change in the location of the mobile biometric device. For example, if the biometric device moves significantly within a short period of time (e.g., relative to the physical location), the determined distance between the biometric device and the physical location may have become inaccurate or invalid over the short period of time. The specific time limit may be defined to be more conservative (e.g., shorter) or longer depending on the mobility and/or movement characteristics of the biometric device. The specific time limit may be defined based in part on the predefined distance value. In some embodiments, the specific time limit and the predefined distance value are determined in connection with each other, as well as other factors (e.g., an amount or rate of change in the location of the mobile biometric device).

By way of illustration, the transaction device may link the acquired biometric information to the transaction if the acquired biometric information is received by a transaction device associated with the physical location within a predetermined time period of initiating the transaction. The transaction device may link the acquired biometric information to the transaction if the distance between the physical location and the biometric device at the time the transaction is initiated is within a specified value. In some embodiments, the transaction device may link the acquired biometric information to the transaction if the acquired biometric information is transferred from the biometric device when the biometric device is within a predefined distance of the transaction device or the physical location.

Referring now to (3408), in more detail, the transaction device may link the acquired biometric information to a universal biometric record of the individual. The universal biometric record may include biometric fields and/or information of one or more types, for example, iris data, voice data, imagery of the individual's face, palm print, finger print, etc. The universal biometric record may include biometric information of a first type. The universal biometric record may include biometric information of a different or second type. In some embodiments, the universal biometric record may include or be associated with information related to the corresponding individual, for example, a social security number, a driving license number, a telephone number, an email address, a device identifier (e.g., of the biometric device), a credit card or other financial account number, a unique user identifier (e.g. UUID), an index number for the universal biometric record, or any other identifying or user information.

The universal biometric record may include biometric information of a first type that matches the acquired biometric information, e.g., iris information. Matching may comprise matching a biometric type (e.g., iris, voice or fingerprint type), regardless of whether the acquired biometric data matches biometric data held in the universal biometric record. Matching may comprise matching the acquired biometric data with biometric data (e.g., of the same type) included in the universal biometric record. The transaction device may link the acquired biometric information to a transaction of the individual and/or a universal biometric record of the individual. The universal biometric record may include an identifier of the individual, such as a UUID as described above, and/or biometric information of a type that matches the acquired biometric information In some embodiments, the biometric device transmits the acquired biometric information to a biometric matching device or a transaction device located at or connected to the physical location. The biometric device may transmit the acquired biometric information to a biometric matching device or a transaction device located at or connected to the physical location if the distance is determined to be within the predefined value. The biometric device may transmit the acquired biometric information if the distance from the biometric matching device or a transaction device is less than the predefined value. The biometric device may transmit the acquired biometric information if the biometric information is acquired within a specific time from the initiation of the transaction. The biometric matching device or transaction device may receive, store and/or process the acquired biometric information if the biometric information is acquired within a specific time from the initiation of the transaction. The biometric matching device or transaction device may assume the integrity of the acquired biometric information if the biometric information is acquired within a specific time from the initiation of the transaction. The acquired biometric data may include raw biometric information (e.g., voice sample, iris and face imagery) acquired from the user, and/or data extracted or processed from raw biometric information. In some embodiments, instead of transmitting the acquired biometric data, the biometric device may transmit a result of matching, verifying and/or identifying the individual based on the acquired biometric data.

The transaction device may identify or locate a universal biometric record based on the acquired biometric information and/or any information about the individual in association with the transaction. The transaction device may identify or locate a universal biometric record from a database or plurality of universal biometric records. The transaction device may identify or locate a universal biometric record based on the purported identity of the individual and/or any user/transaction data. The transaction device may match the acquired biometric data with biometric data included in the identified universal biometric record. The universal biometric record may be created or generated from an enrollment stage or process, e.g., during which an individual's biometrics and other information are securely and/or accurately collected. The universal biometric record may be built and/or assembled over a period of time, for example, different pieces of biometric and/or user data may be generated, collected and/or consolidated during enrollment/registration, during the course of one or more transactions, and/or from existing records or databases.

In some embodiments, the transaction device may allow or deny the transaction at the physical location based on biometric matching, identification or verification using the acquired biometric information and/or other user information. The transaction device may allow or deny the transaction based on a result of biometric matching, identification or verification, received from the biometric device. The transaction may comprise one of: a point-of-sale transaction, a point-of-service transaction, and an access control transaction. The transaction device may allow or deny the transaction responsive to identifying an universal biometric record and/or matching the acquired biometric information with an universal biometric record of the individual.

In some embodiments, the transaction device or a biometric matching device may identify the individual based on the acquired biometrics, and may link the transaction at the physical location with the individual. The transaction device or biometric matching device may identify the individual via a universal biometric record and/or identifier (e.g., UUID) of the individual. The transaction device may identify the individual via any user information, such a credit card number and/or an identifier of the individual's mobile biometric device. The transaction device or biometric matching device may identify the individual via any combination of acquired biometric data and user information used in the transaction. In some embodiments, the transaction device retrieves an identifier (e.g., UUIC) of the individual based on the acquired biometrics and/or transaction data, and links the transaction at the physical location with the identifier. In certain embodiments, the transaction device links the transaction to a universal biometric record of the individual. The universal biometric record may include biometric information of a first type that matches the acquired biometric information (e.g., by type and/or by data).

Referring now to (3410), in more detail, a biometric integrity engine may identify, via the universal biometric record, another transaction (e.g., a second transaction). The second transaction may be linked to acquired biometric information that matches the biometric information of the second type. In some embodiments, the biometric integrity engine identifies a second transaction linked with the identifier of the individual. The second transaction may be linked with the identifier of the individual via the universal biometric record, or some other record/profile of the individual. The second transaction may be linked with the identifier of the individual via matching of one or more types of biometric data. In some embodiments, the biometric integrity engine may link the transaction with another transaction linked to the individual and/or acquired biometric data. The biometric integrity engine may establish a biometric chain of provenance between one or more sets of acquired biometric data and one or more transactions. In some embodiments, the second transaction may occur before, during and/or after the first transaction, and may occur during a portion of the first transaction. The second transaction may acquire biometric data of the same or a different type. In some embodiments, the first or the second transaction may not involve any biometrics.

Referring now to (3412), in more detail, the biometric integrity engine may compare information from the first transaction and the second transaction for inconsistency or fraud. The biometric integrity engine may compare biometric information acquired from the two transactions against data included in the universal biometric record of the individual. The biometric integrity engine may compare user or transaction data (e.g., biometric or mobile device identifier, credit card number, UUID) between the two transactions. In some embodiments, the biometric integrity engine may compare information from a plurality of transactions that are each linked to one or more other transactions from within the plurality of transactions.

The biometric integrity engine may compare information from the transactions for inconsistencies, for example, differences in a certain type of data (e.g., credit card number, biometric data or biometric device identifier), which may be expected or expected to be the same between two transactions. The biometric integrity engine may detect that two transactions occurred at the same time (which may be improbable), and perhaps at different locations. The biometric integrity engine may detect that two universal biometric records exist, and that the two records may show differences or inconsistencies between them. The biometric integrity engine may detect that a set of biometric data acquired during one transaction does not match those of another transaction. The biometric integrity engine may detect possible or attempted fraud in one or both transactions. For example, the biometric integrity engine may detect that biometrics acquired from each transaction of the same purported individual do not match with each other.

In some embodiments, the biometric integrity engine may incorporate or add data into the universal biometric record if the data from the two transactions are verified to be consistent and/or non-fraudulent. The incorporated data may be compared against data from another transaction, for any inconsistency and/or possible fraud. If any inconsistency or possible fraud is detected, the corresponding universal biometric record may be modified or adjusted. If any inconsistency or possible fraud is detected, the biometric integrity engine may flag such an issue to the user. If any inconsistency or possible fraud is detected, the biometric integrity engine may terminate the link or association between the transactions. For example, if an inconsistency between two previous transactions was detected automatically by a failure to match an iris biometric, then future transactions associated to the UUID involved in the failed transaction can be suspended, even if such attempted transactions involve only the face biometric and not the iris biometric. If any inconsistency or possible fraud is detected, the biometric integrity engine may exclude from universal biometric record the information showing the inconsistency or possible fraud. If any inconsistency or possible fraud is detected, the biometric integrity engine may trigger an update, re-evaluation, and/or creation of a universal biometric record. In certain embodiments, the comparison between transactions ensures integrity of acquired biometric data linked to one or more transactions.

Having described certain embodiments of the methods and systems, it will now become apparent to one of skill in the art that other embodiments incorporating the concepts of the invention may be used. It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

What is claimed:

1. A method for vehicular, indoors or outdoors access control, the method comprising:
receiving, via a mobile device, a user credential for use in performing access control;
communicating a first signal between the mobile device and an audio unit of an access control device, the first signal comprising an audio signal;
using the audio signal to determine a distance of the mobile device from the audio unit, and to distinguish the mobile device from another mobile device within an operating range of the access control device; and
using the received user credential or an authentication result from the received user credential to perform the access control, responsive to the determined distance being within a predetermined range and responsive to the determination of the distance being performed within a predetermined time from receiving the user credential.

2. The method of claim 1, wherein receiving the user credential comprises receiving user biometric information via the mobile device.

3. The method of claim 1, further comprising performing authentication using the received user credential.

4. The method of claim 1, wherein at least one of the receiving and the communicating steps occur while the mobile device is moving relative to the audio unit of the access control device.

5. The method of claim 1, further comprising communicating a second signal comprising a second audio signal between the mobile device and the audio unit in a return path relative to the first signal, responsive to the first signal being communicated between the mobile device and the audio unit.

6. The method of claim 5, further comprising determining the distance using a time of flight of the first and second signals being communicated between the mobile device and the audio unit.

7. The method of claim 1, further comprising communicating, at a same time as the first signal, a second signal comprising a radio frequency signal between the mobile device and the audio unit, and using a difference in arrival times of the first and the second signals at the audio unit to determine the distance.

8. The method of claim 1, wherein communicating the first signal comprises communicating the first signal from the mobile device to a plurality of audio units of the access control device, the plurality of audio units each disposed at a different location.

9. The method of claim 1, further comprising detecting that a user of the mobile device is in physical contact with the mobile device between a time at which the user credential was received by the mobile device and a time at which the distance was determined.

10. The method of claim 1, wherein communicating the first signal comprises communicating an ultrasonic audio signal between the mobile device and the audio unit.

11. A system for vehicular, indoors or outdoors access control, the system comprising:

an access control server comprising at least one processor, the access control server configured to:
- receive, via a mobile device, a user credential for use in performing access control, wherein a first signal is communicated between the mobile device and an audio unit of an access control device, the first signal comprising an audio signal;
- use the audio signal to determine a distance of the mobile device from the audio unit, and to distinguish the mobile device from another mobile device within an operating range of the access control device; and
- use the received user credential or an authentication result from the received user credential to perform the access control, responsive to the determined distance being within a predetermined range and responsive to the determination of the distance being performed within a predetermined time from receiving the user credential.

12. The system of claim 11, wherein the user credential comprises user biometric information.

13. The system of claim 11, wherein the access control server is configured to perform authentication using the received user credential.

14. The system of claim 11, wherein at least one of the receiving of the user credential and the communicating of the first signal occur while the mobile device is moving relative to the audio unit of the access control device.

15. The system of claim 11, wherein the access control server is further configured to communicate a second signal comprising a second audio signal between the mobile device and the audio unit in a return path relative to the first signal, responsive to the first signal being communicated between the mobile device and the audio unit.

16. The system of claim 15, wherein the access control server is configured to determine the distance using a time of flight corresponding to the first signal and the second signal being communicated between the mobile device and the audio unit.

17. The system of claim 11, wherein a second signal comprising a radio frequency signal is communicated between the mobile device and the audio unit at a same time as the first signal, and the access control server is configured to use a difference in arrival times of the first and the second signals at the audio unit to determine the distance.

18. The system of claim 11, wherein the access control server is configured to communicate the first signal from the mobile device to a plurality of audio units of the access control device, the plurality of audio units each disposed at a different location.

19. The system of claim 11, wherein the access control server is configured to use the received user credential or an authentication result from the received user credential to perform the access control, responsive to a detection that a user of the mobile device is in physical contact with the mobile device between a time at which the user credential was received by the mobile device and a time at which the distance was determined.

20. The system of claim 11, wherein the first signal comprises an ultrasonic audio signal.

* * * * *